United States Patent
Hsu et al.

(10) Patent No.: US 9,335,027 B2
(45) Date of Patent: May 10, 2016

(54) METHODS AND APPARATUS FOR TRANSPARENT DISPLAY USING SCATTERING NANOPARTICLES

(71) Applicants: Chia Wei Hsu, Cambridge, MA (US); Wenjun Qiu, Cambridge, MA (US); Bo Zhen, Cambridge, MA (US); Ofer Shapira, Cambridge, MA (US); Marin Soljacic, Belmont, MA (US)

(72) Inventors: Chia Wei Hsu, Cambridge, MA (US); Wenjun Qiu, Cambridge, MA (US); Bo Zhen, Cambridge, MA (US); Ofer Shapira, Cambridge, MA (US); Marin Soljacic, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/067,471

(22) Filed: Oct. 30, 2013

(65) Prior Publication Data
US 2014/0185282 A1 Jul. 3, 2014

Related U.S. Application Data

(60) Provisional application No. 61/748,228, filed on Jan. 2, 2013, provisional application No. 61/748,259, filed on Jan. 2, 2013, provisional application No. 61/866,468, filed on Aug. 15, 2013.

(51) Int. Cl.
*F21V 9/12* (2006.01)
*F21V 9/08* (2006.01)
(Continued)

(52) U.S. Cl.
CPC .... *F21V 9/12* (2013.01); *F21V 9/08* (2013.01); *G02F 1/0126* (2013.01); *G02F 1/19* (2013.01); *G09F 13/00* (2013.01); *B82Y 20/00* (2013.01); *Y10S 977/773* (2013.01)

(58) Field of Classification Search
CPC ............. G02B 27/01; F21V 9/12; F21V 9/08; G02F 1/0126; G02F 1/19; G09F 13/00; B82Y 20/00; Y10S 977/773
See application file for complete search history.

(56) References Cited

U.S. PATENT DOCUMENTS

| | | | |
|---|---|---|---|
| 4,870,485 A | 9/1989 | Downing et al. | |
| 5,764,403 A | 6/1998 | Downing | |

(Continued)

FOREIGN PATENT DOCUMENTS

| | | |
|---|---|---|
| KR | 10-2008-0082783 | 9/2008 |
| KR | 10-2009-0120171 | 11/2009 |

(Continued)

OTHER PUBLICATIONS

International Search Report and Written Opinion of the International Search Authority in related PCT Application No. PCT/US2013/078233 dated Apr. 18, 2014, 12 pages.

(Continued)

*Primary Examiner* — Mary Ellen Bowman
(74) *Attorney, Agent, or Firm* — Cooley LLP

(57) ABSTRACT

Transparent displays enable many useful applications, including heads-up displays for cars and aircraft as well as displays on eyeglasses and glass windows. Unfortunately, transparent displays made of organic light-emitting diodes are typically expensive and opaque. Heads-up displays often require fixed light sources and have limited viewing angles. And transparent displays that use frequency conversion are typically energy inefficient. Conversely, the present transparent displays operate by scattering visible light from resonant nanoparticles with narrowband scattering cross sections and small absorption cross sections. More specifically, projecting an image onto a transparent screen doped with nanoparticles that selectively scatter light at the image wavelength(s) yields an image on the screen visible to an observer. Because the nanoparticles scatter light at only certain wavelengths, the screen is practically transparent under ambient light. Exemplary transparent scattering displays can be simple, inexpensive, scalable to large sizes, viewable over wide angular ranges, energy efficient, and transparent simultaneously.

21 Claims, 15 Drawing Sheets

(51) Int. Cl.
*G09F 13/00* (2006.01)
*G02F 1/01* (2006.01)
*G02F 1/19* (2006.01)
*B82Y 20/00* (2011.01)

(56) References Cited

U.S. PATENT DOCUMENTS

| | | | |
|---|---|---|---|
| 6,897,999 | B1 | 5/2005 | Bass et al. |
| 6,986,581 | B2 | 1/2006 | Sun et al. |
| 7,090,355 | B2 | 8/2006 | Liu et al. |
| 7,136,031 | B2 | 11/2006 | Lee et al. |
| 7,182,467 | B2 | 2/2007 | Liu et al. |
| 7,213,923 | B2 | 5/2007 | Liu et al. |
| 7,452,082 | B2 | 11/2008 | Sun et al. |
| 7,537,346 | B2 | 5/2009 | Liu et al. |
| 7,587,120 | B2 | 9/2009 | Koo et al. |
| 8,123,365 | B2 | 2/2012 | Quach et al. |
| 8,187,726 | B2 | 5/2012 | Sasaki et al. |
| 8,294,993 | B2 | 10/2012 | Niesten |
| 8,525,829 | B2 | 9/2013 | Smithwick et al. |
| 8,651,678 | B2 | 2/2014 | Lanman et al. |
| 8,681,174 | B2 | 3/2014 | Nam et al. |
| 8,803,947 | B2 | 8/2014 | Cho et al. |
| 8,920,685 | B2 | 12/2014 | Jang et al. |
| 8,923,686 | B2 | 12/2014 | Krishnaswamy |
| 9,139,737 | B1 | 9/2015 | Shah et al. |
| 2005/0040562 | A1 | 2/2005 | Steinmann et al. |
| 2005/0094266 | A1 | 5/2005 | Liu et al. |
| 2005/0231652 | A1 | 10/2005 | Liu et al. |
| 2005/0231692 | A1 | 10/2005 | Sun et al. |
| 2006/0197922 | A1 | 9/2006 | Liu et al. |
| 2007/0065665 | A1 | 3/2007 | Sato et al. |
| 2008/0043301 | A1 | 2/2008 | Lewis |
| 2010/0253594 | A1* | 10/2010 | Szczerba et al. ............ 345/7 |
| 2012/0019923 | A1 | 1/2012 | Niesten et al. |
| 2012/0234460 | A1 | 9/2012 | Zhang et al. |
| 2012/0320291 | A1 | 12/2012 | Yang et al. |

FOREIGN PATENT DOCUMENTS

| | | |
|---|---|---|
| WO | WO/2005/043232 A2 | 5/2005 |
| WO | WO/2005/043233 A2 | 5/2005 |
| WO | WO/2005/103814 A2 | 11/2005 |
| WO | WO/2006/094262 A2 | 9/2006 |
| WO | WO/2006/094262 A3 | 9/2006 |

OTHER PUBLICATIONS

Althues, H. et al., Functional inorganic nanofillers for transparent polymers. *Chem. Soc. Rev.*, vol. 36, 2007, pp. 1454-1465.
Colombo, A. et al., Nanoparticle-doped large area PMMA plates with controlled optical diffusion. *J. Mater. Chem. C.*, vol. 1, Mar. 8, 2013, pp. 2927-2934.
Colombo, A. et al., Nanoparticle-doped large area PMMA plates with controlled optical diffusion. Electronic Supplementary Material (ESI) for *J. Mater. Chem. C.*, Mar. 8, 2013, pp. 1-5.
Meinardi, F. et al., Large-area luminescent solar concentrators based on 'Stokes-shift-engineered' nanocrystals in a mass-polymerized PMMA matrix. *Nature Photonics*, vol. 8, Apr. 13, 2014, pp. 392-399.
Simonutti, R. et al., Nanoparticles confer tailored optical properties on plastics. *SPIE*, Newsroom, Aug. 18, 2014, pp. 1-3.
Arsenault, A.C. et al., Photonic-crystal full-colour displays. *Nature Photonics*, vol. 1, Aug. 2007, pp. 468-472.
Chatterjee, U. et al., Dispersion of Functionalized Silver Nanoparticles in Polymer Matrices: Stability, Characterization, and Physical Properties. *Polymer Composites*, 2009, pp. 827-834.
Chou, J.B. et al., Design of Wide-Angle Selective Absorbers/Emitters with Dielectric Filled Metallic Photonic Crystals for Thermophotovoltaic Applications. *Optics Express*, vol. 22, No. 51, pp. A144-A154, (published Dec. 17, 2013).
Dodgson, N. A., 3D without the glasses. *Nature*, vol. 495, Mar. 21, 2013, pp. 316-317.

Fattal, D. et al., A multi-directional backlight for a wide-angle, glasses-free three-dimensional display. *Nature*, vol. 495, Mar. 21, 2013, pp. 348-351.
Geng, J., Three-dimensional display technologies. *Advances in Optics and Photonics*, vol. 5, Nov. 22, 2013, pp. 456-535.
Hinklin, T.R. et al., Transparent, Polycrystalline Upconverting nanoceramics: Towards 3-D Displays. *Advanced Materials*, vol. 20, 2008, pp. 1270-1273.
Hong, K. et al., Full-color lens-array holographic optical element for three-dimensional optical see-through augmented reality. *Optics Letters*, vol. 39, No. 1, Jan. 1, 2014, pp. 127-130.
Hsu, C.W. et al., Observation of trapped light within the radiation continuum. *Nature*, vol. 499, Jul. 11, 2013, pp. 188-191.
Lee, J-H et al., Optimal projector configuration design for 300-Mpixel multi-projection 3D display. *Optics Express*, vol. 21, No. 22, Nov. 4, 2013, 16 pp.
Vodnik, V.V. et al., Thermal and optical properties of silver-poly(methylmethacrylate) nanocomposites prepared by *in-situ* radical polymerization. *European Polymer Journal*, vol. 46, 2010, pp. 137-144.
Wan, W. et al., Directional light-guide devices with continuously variable spatial frequency sub-micron grating structures for autostereoscopic display applications. *Holography, Diffractive Optics, and Applications, SPIE*, vol. 9271, 6 pp. (Nov. 11, 2014).
Zhang, S. et al., Enhancing the emission directionality of organic light-emitting diodes by using photonic microstructures. *Applied Physics Letters*, vol. 103, Nov. 21, 2013, 4 pp.
"SplitView" technology for the E Class: One screen for two programs, Separate Info for driver and front-seat passenger, Bosch Press Release, May 2013, 2 pp.
Cheng, F. et al., "Structural color printing based on plasmonic metasurfaces of perfect light absorption", Scientific Reports, Jun. 5, 2015, 10 pages.
Engheta, N., "Pursuing Near-Zero Response", Science, vol. 340, Apr. 19, 2013, pp. 286-287.
Graham-Rowe, D., "Tunable structural colour", Out of the Lab, Nature Photonics, vol. 3, Oct. 2009, pp. 551-553.
Hamann, R. E., et al.,"Coupled-mode theory for general free-space resonant scattering of waves", Physical Review A, vol. 75, (2007), pp. 053801-1-053801-5.
Huang, X. et al., "Dirac cones induced by accidental degeneracy in photonic crystals and zero-refractive-index materials", Nature Materials, vol. 10, (Aug. 2011), pp. 582-586.
Kim, H. et al., "Structural colour printing using a magnetically tunable and lithographically fixable photonic crystal", Nature Photonics, vol. 3, Sep. 2009, pp. 534-540.
Li, Y. et al., "On-chip zero-index metamaterials", Nature Photonics, vol. 9, (Nov. 2015), pp. 738-743.
Lu, Y. J., et al., "All-Color Plasmonic Nanolasers with Ultralow Threshholds: Autotuning Mechanism for Single-Mode Lasing", Nano Letters, vol. 14, (2014), pp. 4381-4388.
Moitra, P., "Realization of an all-dielectric zero-index optical metamaterial", Nature Photonics, vol. 7, (Oct. 2013), pp. 791-795.
Schilling, J., "The quest for zero refractive index", Nature Photonics, vol. 5, (Aug. 2011), pp. 449-451.
Zhen, B. et al., "Spawning rings of exceptional points out of the Dirac cones", Nature, vol. 525, Sep. 17, 2015, pp. 354-358.
Zhou, M. et al., "Extraordinary Large Optical Cross Section for Localized Single Nanoresonator", Physical Review Letters, Jul. 10, 2015, pp. 023903-1-023903-5.
Head-up display link, from Wikipedia, the free encyclopedia, (2015), https://en.wikipedia.org/wiki/Head-up_display, retrieved on Dec. 18, 2015, 5 pages.
HoloPro™ link, http://www.holopro.com/, (Jan. 2015), retrieved on Dec. 18, 2015, 3 pages.
Kimoto—Projection Screen Films link, http://www.kimototech.com/projection_screen_films.html, (2015), retrieved on Dec. 18, 2015, 2 pages.
ProDisplay—Projector Screens and Films, LED/LCD Displays, Touch Screens link, (2015), http://prodisplay.com/, retrieved on Dec. 18, 2015, 6 pages.
SpyeGlass, SpyeGrey, SpyeFrost, SypeClear Installation link, http://www.spyeglass.com/Spyeglass-clear.html, (2015), retrieved on Dec. 18, 2015, 1 page.

\* cited by examiner

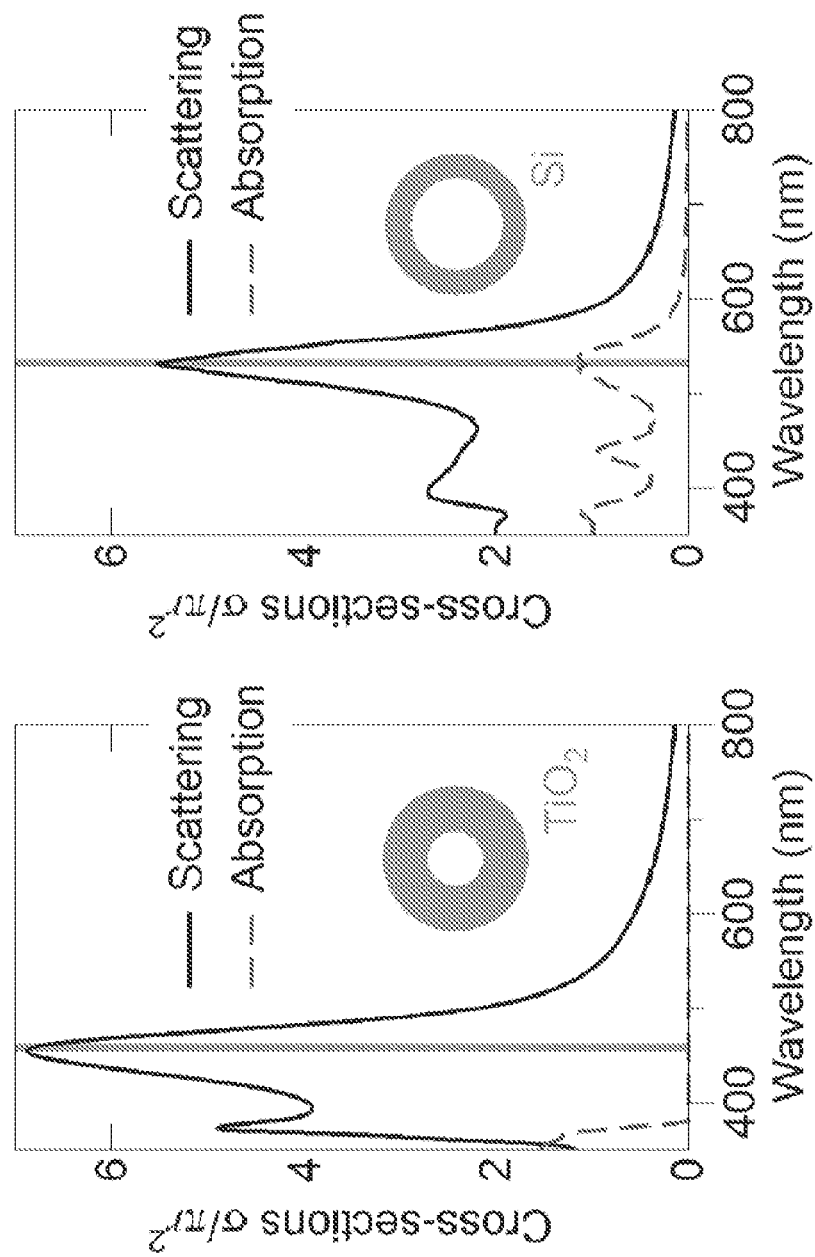

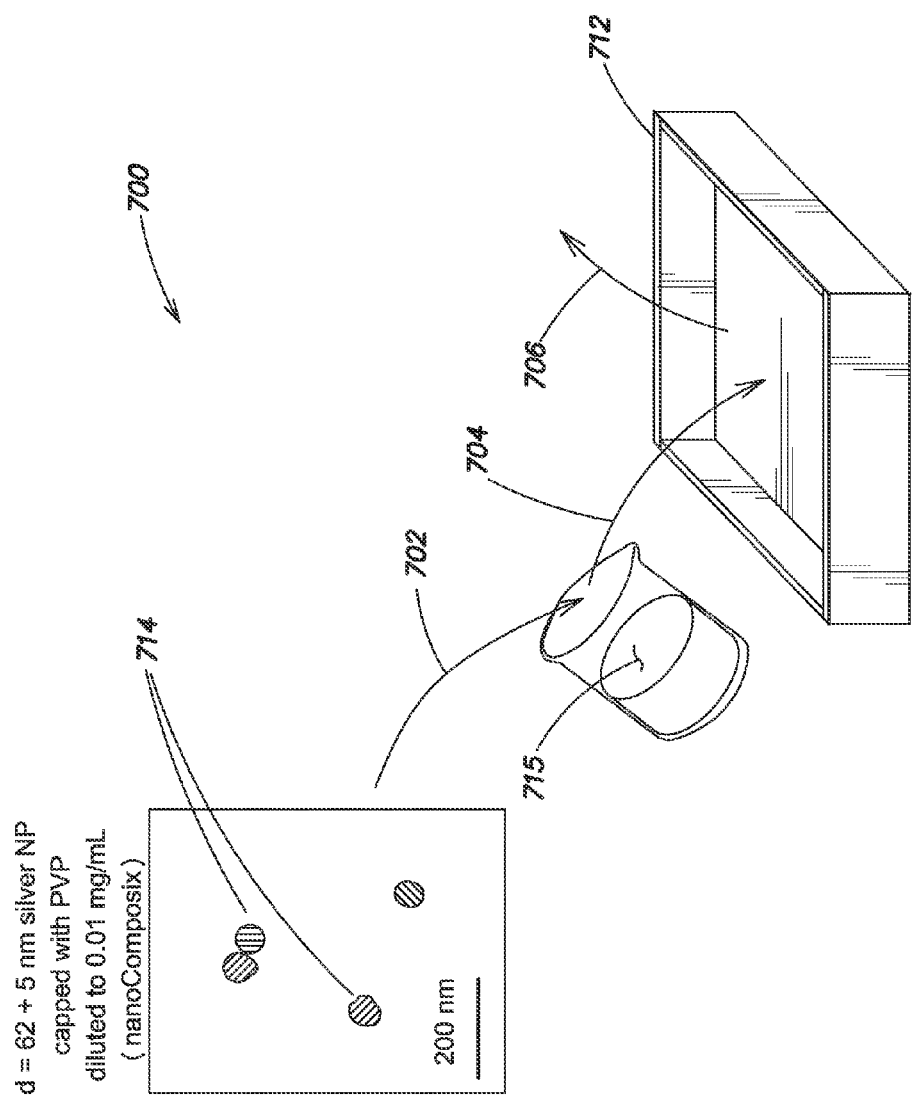

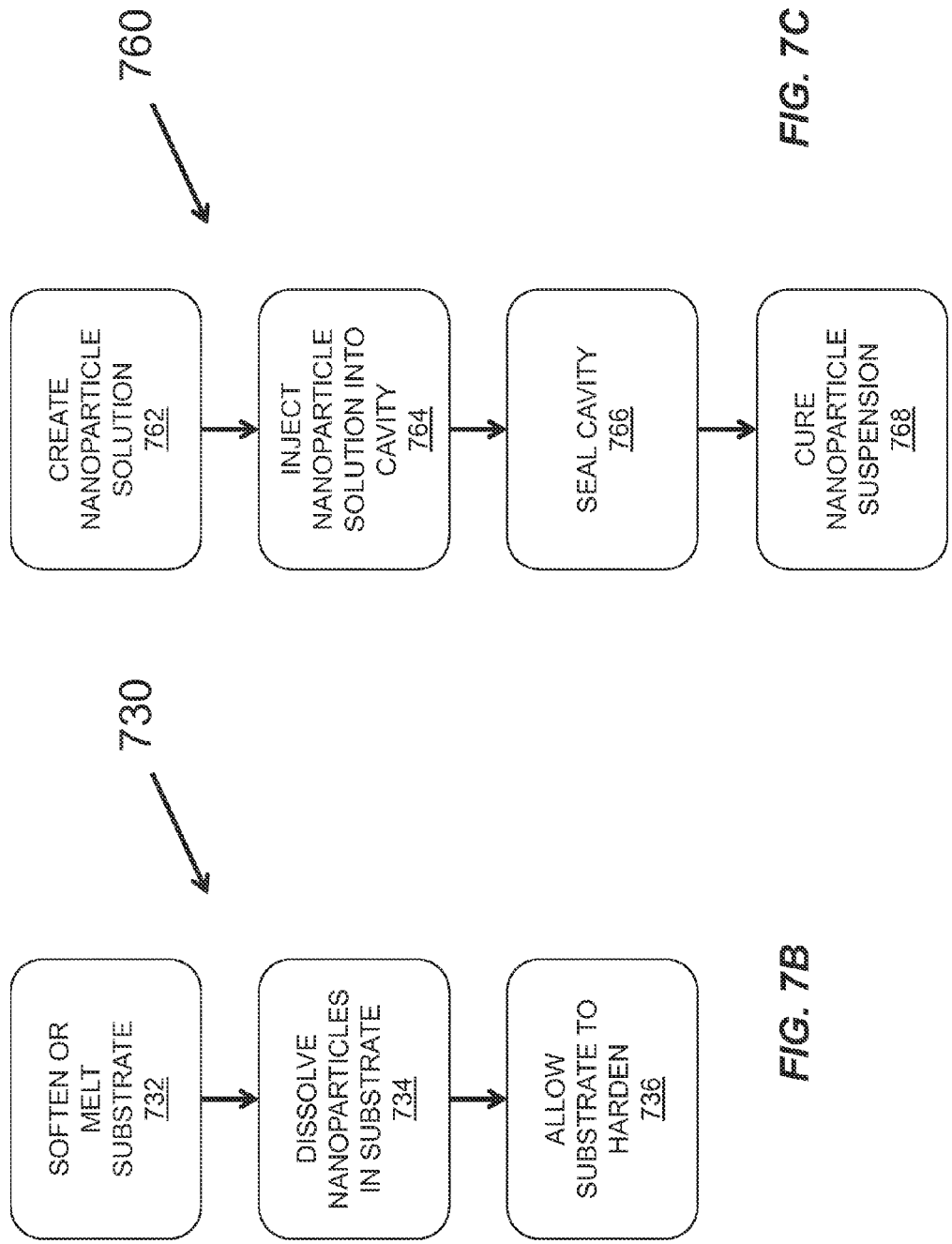

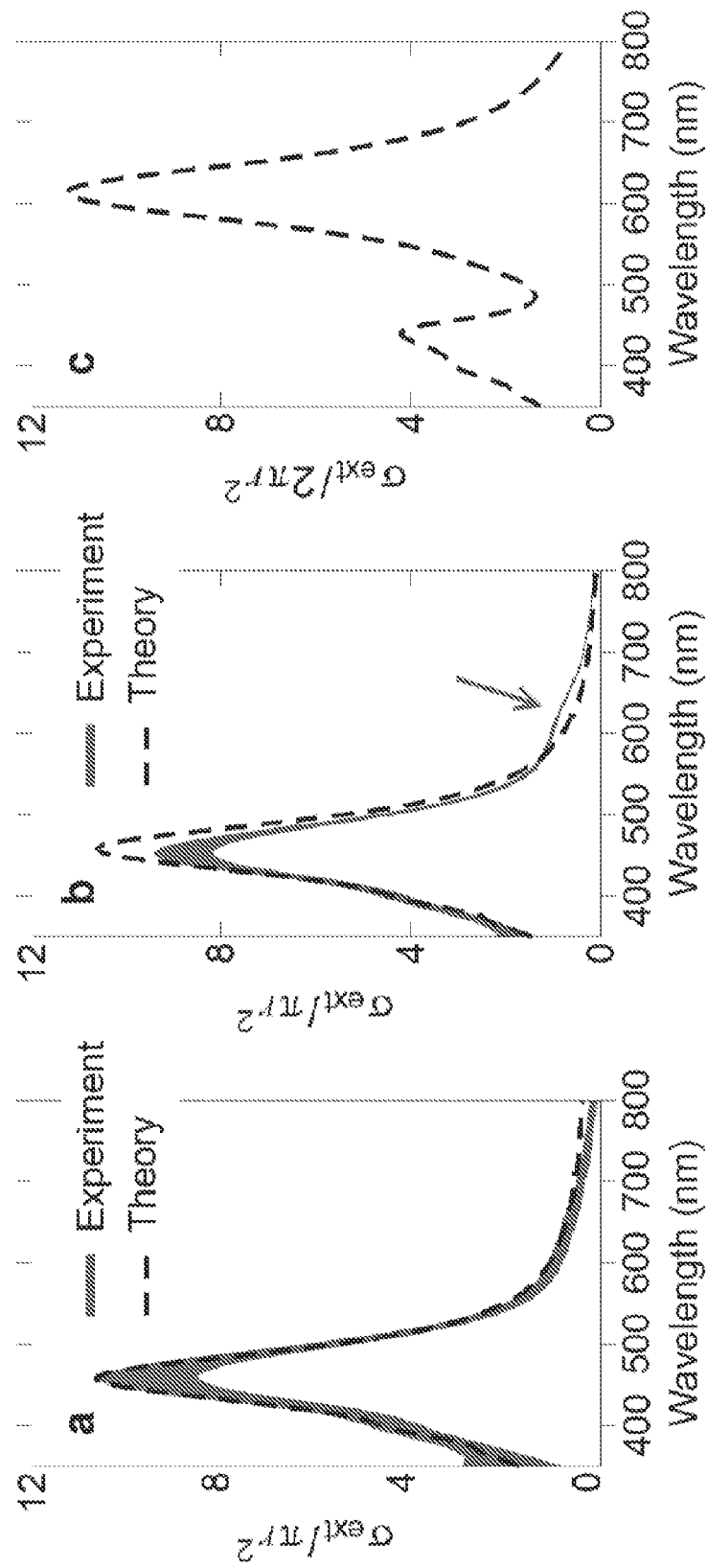

METHODS AND APPARATUS FOR TRANSPARENT DISPLAY USING SCATTERING NANOPARTICLES

CROSS-REFERENCE TO RELATED APPLICATIONS

This application claims the benefit, under 35 U.S.C. §119(e), of U.S. Application No. 61/748,228, filed on Jan. 2, 2013, and entitled "Methods and Apparatus for Transparent Display Using Scattering Particles," which application is hereby incorporated by reference in its entirety.

This application also claims the benefit, under 35 U.S.C. §119(e), of U.S. Application No. 61/748,259, filed on Jan. 2, 2013, and entitled "Methods and Apparatus for Transparent Display Using Up-Converting Particles," which application is hereby incorporated by reference in its entirety.

This application also claims the benefit, under 35 U.S.C. §119(e), of U.S. Application No. 61/866,468, filed on Aug. 15, 2013, and entitled "Methods and Apparatus for Transparent Display Using Up-Converting Particles," which application is hereby incorporated by reference in its entirety.

GOVERNMENT SUPPORT

This invention was made with government support under Grant No. DMR0819762 awarded by the National Science Foundation and under Contract No. W911NF-07-D-0004 awarded by the Army Research Office and under Grant Nos. DE-SC0001299 and DE-FG02-09ER46577 awarded by the Department of Energy. The government has certain rights in the invention.

BACKGROUND

Transparent displays are long sought-after by scientists and engineers. Two-dimensional (2D) transparent displays can create images that appear floating in the air, in contrast to traditional displays where images appear on a visible screen. Aside from creating special visual impressions, such displays can have a wide variety of applications. A glass window can be turned into the screen of a home theater. Eyeglasses can become a mini computer screen. The windshield of a vehicle can show information such as maps without blocking the driver's view. The display window of a store can show not only products but also their information.

A number of transparent display technologies exist, but none have gained a widespread usage. Liquid crystal displays (LCD) can be made transparent by eliminating the backlight, but they are not very transparent (the typical transmittance may be less than 15%). Organic light-emitting diodes (OLEDs) can also be made transparent, but the production remains costly and the transmittance is also limited (typically less than 40%). OLED displays can be made flexible and foldable, so transparent flexible displays are also possible. Electroluminescent displays have also been made transparent, but have so far been limited to single colors. Recently, fluorescent films have been combined with ultraviolet (UV) lights to make multi-colored displays that are transparent; however, an intense UV light source, such as an ultra high performance (UHP) lamp, is required due to the small emission cross sections of the fluorescent particles.

SUMMARY

In view of the foregoing, various inventive embodiments disclosed herein relate generally to achieving clear displays with potentially low production costs, and may be the enabling technology to bring transparent displays into the consumer market.

Exemplary embodiments include a display with a transparent substrate, at least one nanoparticle disposed on the transparent substrate, and at least one light source in optical communication with the nanoparticle. Illuminating the nanoparticle with a monochromatic beam from the light source causes the nanoparticle to scatter at least a portion of the monochromatic beam in the direction of a viewer.

Other exemplary embodiments include methods of making displays with one or more nanoparticles that scatter monochromatic light. Such a display may be constructed by depositing at least one nanoparticle that has a scattering cross section with a full-width half maximum of about 1 nm to about 70 nm and a center wavelength from about 390 nm to about 760 nm on a substrate with a transmittance of about 60% to about 100% (e.g., 65%, 70%, 75%, 80%, 85%, 90%, or 95%) from about 390 nm to about 760 nm.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 5A is a plot of the scattering cross section (solid line) and the absorption cross section (dashed line) versus wavelength for a titanium dioxide nanoshell (inset) that strongly scatters blue light and is suitable for use in a transparent scattering display.

FIG. 5B is a plot of the scattering cross section (solid line) and the absorption cross section (dashed line) versus wavelength for a silicon nanoshell (inset) that strongly scatters green light and is suitable for use in a transparent scattering display.

FIG. 7A illustrates a first process for making a transparent scattering display.

FIG. 7B illustrates a second process for making a transparent scattering display.

FIG. 7C illustrates a third process for making a transparent scattering display.

FIG. 8A is a plot of the measured extinction cross section (solid line) and the theoretical extinction cross-section (dashed line) versus wavelength for a solution of spherical silver nanoparticles in PVA with a concentration of about 5 µg/mL.

FIG. 8B is a plot of the measured extinction cross section (solid line) and the theoretical extinction cross-section (dashed line) versus wavelength for a solution of spherical silver nanoparticles in polyvinyl alcohol (PVA) with a concentration of about 10 µg/mL.

FIG. 8C is a plot of the theoretical extinction cross-section versus wavelength for two silver nanoparticles that stick together (e.g., as shown in the inset of FIG. 9A) when illuminated with light polarized along the axis of alignment.

DETAILED DESCRIPTION

Figure 1A:
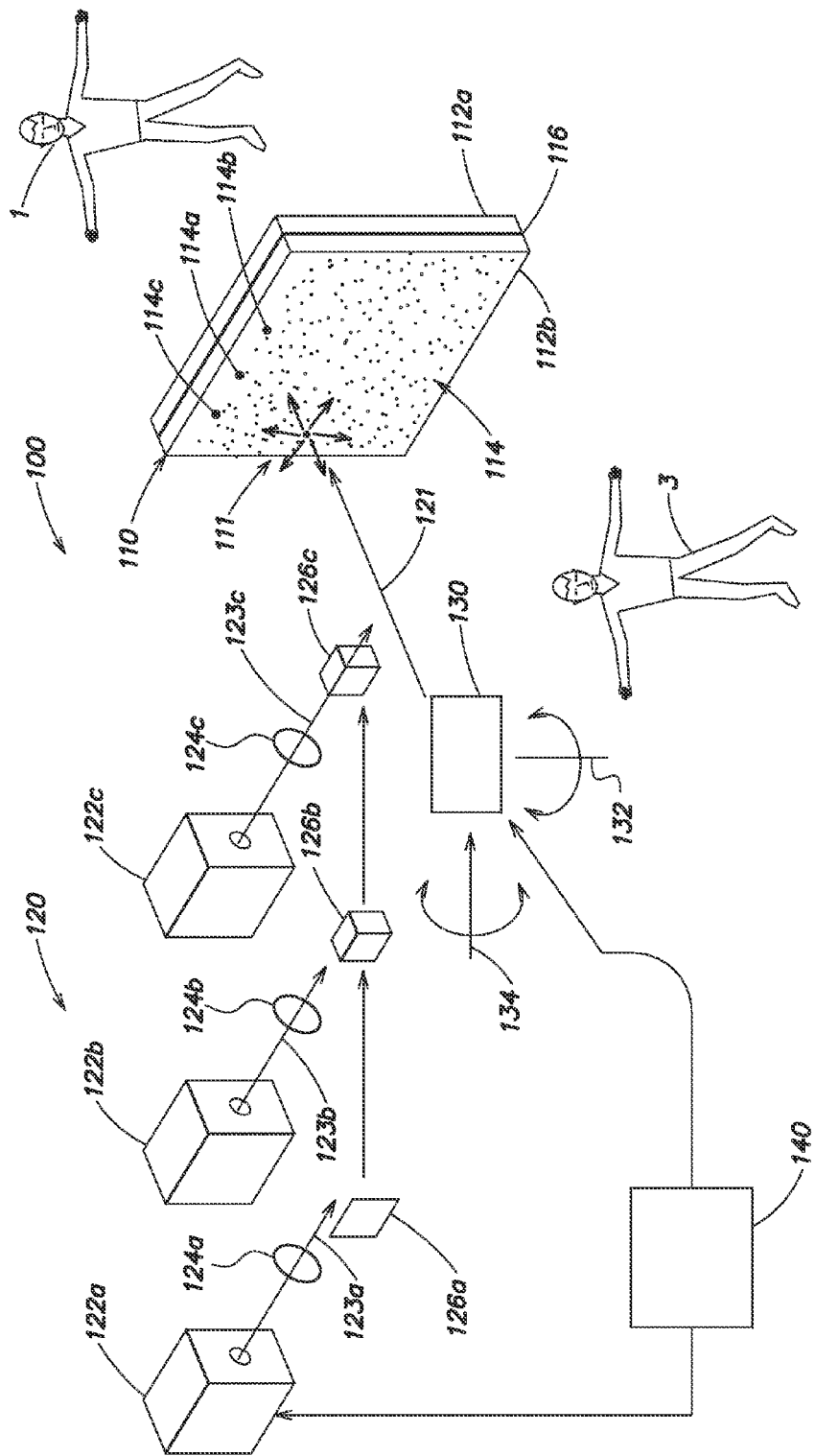
FIG. 1A is a schematic drawing of a transparent scattering display.

In a traditional display system based on light projection—for example, projectors used for presentations and in movie theaters—the screens are opaque to maximize scattering of the projected light so that viewers can see images on the screen. In such cases, the screen scatters light efficiently, but cannot be transparent. Existing transparent 2D and 3D laser display technologies convert ultraviolet (UV) or infrared (IR) light into visible light with a screen that is transparent in the visible portion of the electromagnetic spectrum but not in the UV or IR regions of the electromagnetic spectrum. Fluorescent or nonlinear materials on the screen convert the UV or IR light into visible light that is displayed to the viewer. Fluorescent or nonlinear conversion enables screen transparency, but most fluorescent and nonlinear materials do not convert the incident light efficiently (in other words, they suffer from low frequency-conversion efficiency). As a result, fluorescent and nonlinear displays typically employ high-power light sources the UV/IR light sources.

As explained herein, however, it is possible to create a passive screen that is both substantially transparent at visible wavelengths and uses visible illumination to display images efficiently. This sounds contradictory, but can be explained as follows. Sunlight and light from typical indoor/outdoor lighting fixtures (e.g., incandescent light bulbs, fluorescent lamps, etc.) include broad ranges of wavelengths. However, a mixture of monochromatic light at three or more specified wavelengths—for example red, green, and blue (RGB)—is enough to produce almost all colors perceived by humans. This makes it possible to create a screen (display) that is transparent in the visible spectrum except at narrowband regions near the specified wavelengths.

An exemplary transparent scattering display uses nanoparticles that scatter strongly at one or more specific visible wavelengths and transmit at all other visible wavelengths to produce color images that can be perceived easily by most humans. For instance, a transparent scattering display might scatter about 30-70% (e.g., 35%, 40%, 45%, 50%, 55%, 60%, or 65%) at one or more predetermined narrowband wavelength ranges and transmit 20% or more (e.g., 30%, 40%, 50%, 60%, 70%, 80%, 90%, or 100%) of incident visible light outside those wavelength ranges. The nanoparticles can be coated onto or embedded in a transparent substrate or sandwiched between a pair of transparent substrates to form a transparent scattering screen. If the nanoparticles' scattering efficiency at the specified wavelength(s) is high enough, illuminating the transparent scattering screen with a relatively low-power beam from a laser, light-emitting diode, or other spectrally coherent source at one or more of the specified wavelengths produces an image visible to an observer in front of or behind the screen.

Depending on the nanoparticles' scattering wavelengths and the light source, the transparent scattering display may be monochromatic or multi-color. For instance, if the nanoparticles scatter strongly only at wavelengths at or near about 450 nm, then the display will be blue. (Absorbing nanoparticles for black displays are also possible.) Similarly, a transparent scattering display with nanoparticles that scatter strongly at multiple wavelengths (e.g., 450 nm and 650 nm) can be used to show multi-color images. And a transparent scattering display with nanoparticles that scatter strongly at three or more specified wavelengths (e.g., 450 nm, 550 nm, and 650 nm) can be used as a full-color display.

A full-color transparent display may be based on an additive color scheme in which combining appropriately weighted amounts of red, green, and blue light yields the desired color. For example, adding red and blue yields magenta, adding blue and green yields cyan, and adding green and red yields yellow. Adding colors on a transparent screen that hosts red-, green-, and blue-scattering particles (or another suitable set of scattering particles) is simply a matter of illuminating a single spot on the screen with beams of red, green, and blue light with appropriately weighted intensities. If the beams' intensities are modulated as the beams are scanned across the screen at rates faster than the eye's integration period, the beams produce what appears to an observer as a full-color image on the screen. Changing the intensity modulation and/or scan pattern produces animated images.

Because the nanoparticles scatter or absorb light only within the narrowband regions near the specified wavelengths, the transparent scattering display may appear transparent under normal lighting conditions if the substrates are relatively transparent as well. In fact, an exemplary transparent scattering display can exhibit a transparency in the visible portion of the electromagnetic spectrum of 90% or higher, while scattering 90% or more of the incident laser light at the scattering wavelength(s). (Higher and lower scattering percentages are also possible, depending on the nanoparticles' characteristics.) Such high scattering efficiency makes it possible to illuminate the screen with a relatively low-intensity beam (e.g., an intensity of about 1 mW or higher), which in turn makes it possible to operate the display's light source at a relatively low level of power consumption.

Exemplary transparent scattering displays can be used for displaying moving images (e.g., video data), static images, etc. They may be suitable for use in heads-up displays; eyeglass/spectacle displays (e.g., Google Glass); contact lens displays; goggle-based displays; large-area displays; and so on. The usable display size depends on the substrate size and the light source's scanning/illumination range, and the refresh rate depends on the light source's scanning rate. Depending on the exact implementation, a transparent scattering display can be used for showing movies, television programs, video games, computer displays, billboards, outdoor and indoor advertising displays, and so on.

A transparent scattering display can also be used for illumination purposes. The screen, instead of being used to display images, can be used to produce diffuse white light and possibly other colors as well, for instance, by selecting an ensemble of scattering particles whose scattering wavelengths span the visible spectrum. The exact color can be customized depending on the nanoparticles' scattering wavelength(s) and the wavelengths and relative intensities of the beams emitted by the light source. Illumination using transparent scattering display offers the energy efficiency of LED illumination coupled with the potential for large-area illumination, e.g., by turning windows in houses, offices, and other buildings into sources of illumination, replacing or supplementing light bulbs on the ceilings. This may create lighting that better imitates natural sunlight.

If desired, a transparent scattering display can be doped or used to host particles that scatter IR or UV light. Illuminating these IR- or UV-scattering particles produces IR or UV images that can be detected with appropriately configured cameras.

Transparent Scattering Displays with Front or Back Light Illumination

FIG. 1A is a diagram of a transparent scattering display 100 suitable for displaying full-color images using illumination from either the front or the rear. The display 100 includes a passive screen 110 made of a transparent medium (substrates 112a and 112b) that hosts nanoparticles 114 with low absorption loss and strong scattering only for light at particular visible wavelengths. When illuminated by a broadband ambient light source (such as the sun, an incandescent light bulb, or a fluorescent lamp), this screen 110 is practically transparent since only a small fraction of the impinging light is absorbed or scattered. However, under monochromatic illumination from a spectrally coherent light source 120 at one or more of the specified visible wavelengths, the screen 110 scatters the incoming light strongly into all directions. Thus, one can efficiently project color images at the scattering wavelength(s) onto this seemingly transparent screen 110. Similar to a regular projector screen, the image on this screen 110 appears through scattering rather than through specular reflection, so the viewing angle is relatively unlimited. Furthermore, the scattering is highly efficient because it does not involve non-linear processes, so the light source 120 can be a low-power source, such as a personal-use laser projector.

The screen 110 is formed of a layer 116 of scattering nanoparticles 114 sandwiched between a pair of substantially transparent (e.g., 90%, 95%, or 99% transparent) substrates 112a and 112b. The substrates 112a and 112b may be formed of any suitable material, including but not limited to glass, plastic, acrylic, and polymers. The substrates can be rigid or flexible; for instance, they may be as rigid as plate glass, e.g., when used in a window display, or as flexible as a sheet of plastic, e.g., when used as a flexible display. For instance, the substrates 112a and 112b can be thin sheets of plastics that are flexible enough to be rolled into a cylinder with a radius of less than one inch. Similarly, the substrates can be thick or thin, e.g., 0.1 mm, 0.25 mm, 0.5 mm, 0.75 mm, 1.0 mm, 2.5 mm, or thicker, depending on the application and the nanoparticle concentration. If desired, the substrates 112a and 112b may be tinted, textured, or otherwise patterned to achieve a particular effect, such as an area of opacity or diffuse transmission.

The layer 116 of scattering nanoparticles 114 sandwiched between the substrates 112a and 112b may be formed by coating, printing, painting, spraying, or otherwise depositing a nanoparticle solution onto one or both of the substrates 112a and 112b as described in greater detail below. In some cases, the substrates 112a and 112b may be pressed together to remove air bubbles and to ensure that the nanoparticle layer's thickness and surface are relatively uniform. The nanoparticle layer 116 may be as thin as the diameter of the largest nanoparticle 114; it can also be much thicker, e.g., several times the largest nanoparticle's diameter, depending on whether or not the nanoparticles 114 clump together and whether the nanoparticle layer 116 includes a matrix (e.g., a polymer matrix) that separates the substrates 112a and 112b. Alternatively, or in addition, spacers (not shown) may separate the substrates 112a and 112b to form a cavity that to holds the nanoparticles 114.

The scattering nanoparticles 114 in the nanoparticle layer 116 may be distributed in a periodic, aperiodic, or random fashion when viewed along the display's optical axis (i.e., the axis normal to the surfaces of the substrates 112a and 112b). In some cases, the nanoparticles 114 are distributed uniformly (if randomly) within the nanoparticle layer 116 with an areal density of about $10^8$ cm$^{-2}$ to about $10^{11}$ cm$^{-2}$ (e.g., $5 \times 10^8$ cm$^{-2}$, $10^9$ cm$^{-2}$, $5 \times 10^9$ cm$^{-2}$, $10^{10}$ cm$^{-2}$, or $5 \times 10^{10}$ cm$^{-2}$). The volumetric density may be about $10^{10}$ cm$^{-2}$ to about $10^{13}$ cm$^{-2}$ (e.g., $5 \times 10^{10}$ cm$^{-2}$, $10^{11}$ cm$^{-2}$, $5 \times 10^{11}$ cm$^{-2}$, $10^{12}$ cm$^{-2}$, or $5 \times 10^{12}$ cm$^{-2}$).) Other areal and volumetric densities may also be possible. In other cases, the nanoparticles 114 may be distributed more or less densely in certain areas, e.g., to form opaque areas or transparent areas on the screen 110.

Given the cross-section(s) and the concentration of the nanoparticles, the thickness of the screen 110 should be chosen to balance the extinction, which is the product of the nanoparticle scattering cross section(s), nanoparticle density, and screen thickness, at the desired wavelength $\lambda_0$ (which should be higher for higher scattering efficiency) and the extinction away from resonance (which should be lower for higher transparency). Generally, the screen 110 should be thick enough that more than half of the light at $\lambda_0$ is scattered, but thin enough that more than half of the light away from resonance is transmitted.

Figure 12:
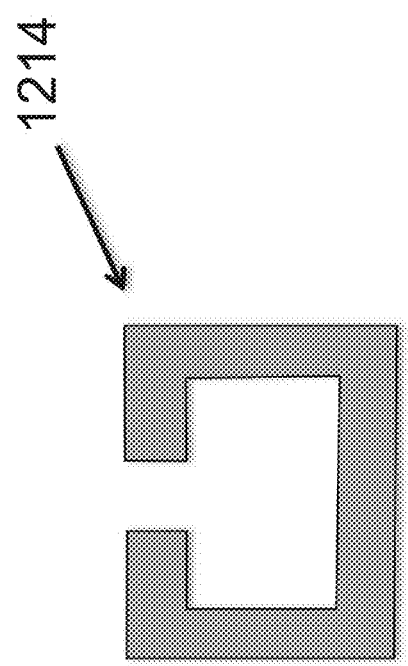
FIG. 12 shows a metallic nanoparticle whose shape supports a narrowband magnetic resonance.

The scattering nanoparticles 114 may be of any suitable shape, including but not limited to spheres, ellipsoids, oblate spheroids, and prolate spheroids. They may be solid particles made of a single material, hollow particles, or solid particles coated with outer layers. The nanoparticle may also be made as a metallic nanoparticle 1214 with a shape that supports formation of a current loop as shown in FIG. 12. Such nanoparticles can support magnetic resonances that may have narrower bandwidths than solid nanoparticles.

The nanoparticles 114 may include dielectric materials, including silica, silicon, and titanium dioxide; metals, including silver, gold, and copper; and combinations of dielectric materials and metals. Their outer diameters may range from about 5 nm to about 250 nm (e.g., 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 95 nm, 100 nm, 125 nm, 150 nm, 175 nm, 200 nm, or 225 nm). The nanoparticles' exact shape, size, and composition may depend on the desired scattering properties.

As explained in greater detail below, the nanoparticles 114 scatter incident light at one or more specified wavelengths depending on their composition and size. If desired, the nanoparticles 114 may include different types of nanoparticles, each of which scatters light at only a narrowband region centered about one or more wavelengths—for example, at about 460 nm, about 530 nm, and about 650 nm. (The nanoparticles 114 scatter and absorb negligible amounts of light at the other wavelengths in the visible spectrum.) For example, the nanoparticles 114 may include red-scattering nanoparticles 114a, green-scattering nanoparticles 114b, and blue-scattering nanoparticles 114c. These red-scattering nanoparticles 114a, green-scattering nanoparticles 114b, and blue-scattering nanoparticles 114c may be mixed in equal proportions, in proportions weighted based on the human eye's sensitivity to different colors, or in any other desired proportion. Alternatively, or in addition, some or all of the nanoparticles 114 may be configured to scatter light at multiple wavelengths (e.g., at wavelengths corresponding to red, green, and blue). Other mixtures of scattering nanoparticles 114 are also possible (e.g., monochromatic, two-color, etc.).

Figure 1B:
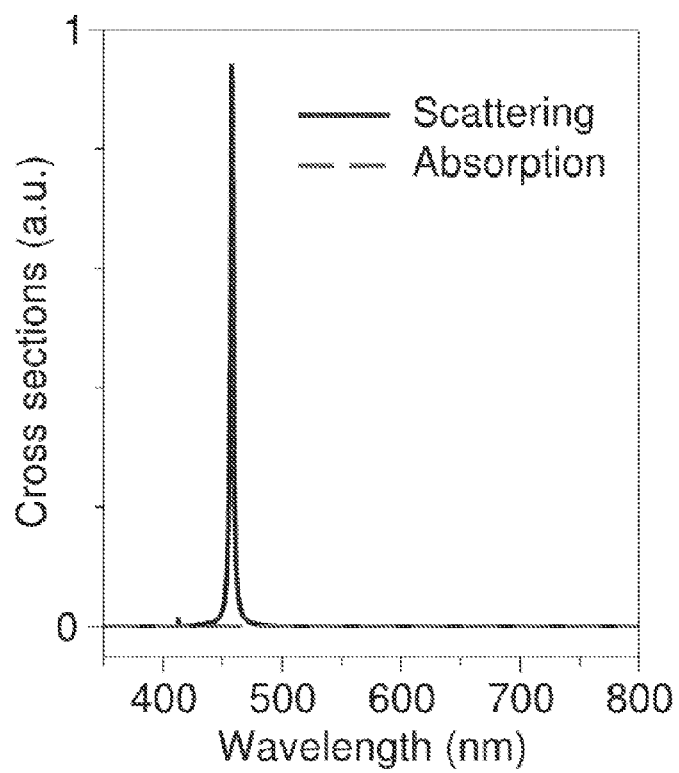
FIG. 1B is a plot of the scattering cross section (solid line) and absorption cross section (dashed line) for a blue scattering particle suitable for use in the transparent scattering display of FIG. 1A.

FIG. 1B is a plot of the scattering cross section (solid line) and the absorption cross section (dashed line) versus wavelength for a blue-scattering nanoparticle 114b. The plot shows that the blue-scattering nanoparticle 114b scatters light strongly at a wavelength of about 460 nm, but does not scatter light significantly at any other wavelength in the visible spectrum. It also shows that the blue-scattering nanoparticle 114b absorbs hardly any light in the visible spectrum. As a result, the blue-scattering nanoparticle 114b is effectively transparent at every wavelength in the visible spectrum except for those in a narrowband region centered at about 460 nm.

In operation, the light source 120 illuminates the nanoparticles 114 at one or more of the nanoparticles' scattering wavelengths. Depending on the implementation, the light source 120 may include one or more lasers, light-emitting diodes (LEDs), or other spectrally coherent sources configured to generate light at wavelengths scattered by one or more of the nanoparticles 114. For instance, the light source 120 may include a first laser diode 122a that emits a first beam 123a at a wavelength of about 460 nm, a second laser diode 122b that emits a second beam 123b at a wavelength of about 530 nm, and a third laser diode 122c that emits a third beam 123c at a wavelength of about 650 nm (collectively, laser diodes 122 and monochromatic laser beams 123). Lens 124a, 124b, and 124c (collectively, lenses 124) and other beam-shaping optics, such as pinholes, prisms, and diffractive elements, collimate or loosely focus the laser beams 123 to prevent divergence. Beam-shaping optics 126, shown in FIG. 1A as a mirror 126a and dichroic beam combiners 126b and 126c, combine the laser beams 123 to form a polychromatic beam 121. Additional beam-shaping optics (not shown) may focus the polychromatic beam 121 to a spot in the plane of the nanoparticle layer 114.

Alternatively, the light source 120 may include a broadband light source (e.g., an ultra high performance (UHP) lamp or household projector). One or more dichroic filters or bandpass filters selects the desired wavelength(s). Because a broadband light source is not monochromatic, its scattering efficiency may not be as high as that of a laser or monochromatic source. However, a broadband light source may provide higher power than a laser diode at a relatively low cost.

To produce an image on the screen 110, a beam-steering element 130, which may include a galvo-scanning mirror or acousto-optic deflector, directs the polychromatic beam 121 to different areas on the screen. In some cases, the beam-steering element 130 may a micro-electromechanical systems (MEMS) device integrated into the light source 120 (e.g., as in the MicroVision SHOWW+ Laser Pico Projector). For example, the beam-steering element 130 may scan the polychromatic beam 121 along a raster pattern (or any other suitable scan pattern) while a controller 140 modulates the intensity of the monochromatic laser beams 123 emitted by the laser diodes 122 to produce the desired image(s) on the screen. The controller 140, which may include a processor, memory, communications interface, user interface, and any other suitable components, may control the beam-steering element 130 and the light source 120 in response to user input, input from a video or image data source, or both to form a particular image or series of images on the screen 110.

Figure 1C:
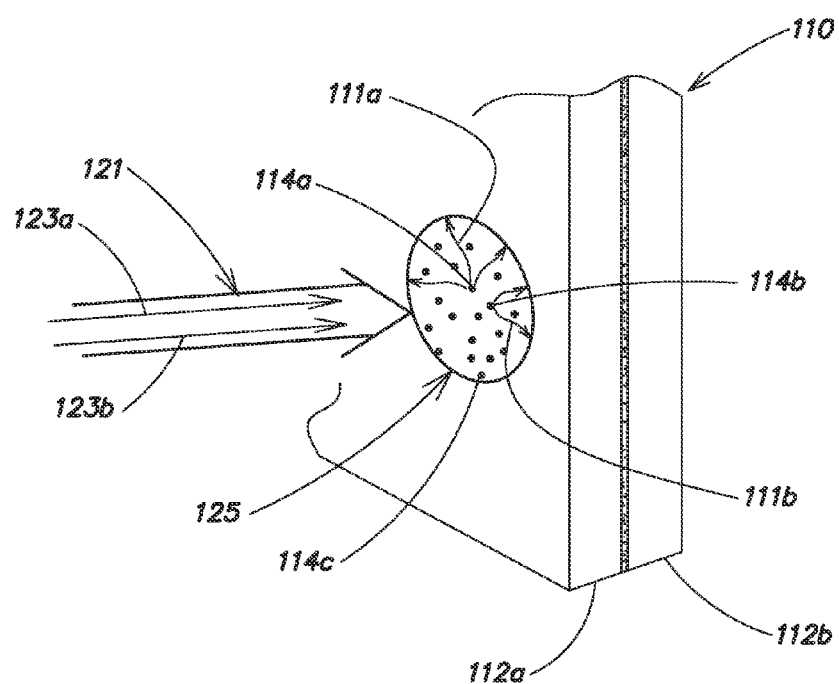
FIG. 1C is a close-up of the transparent scattering display shown in FIG. 1A.

FIG. 1C is a close-up of a section of the screen 110 illuminated by the polychromatic beam 121. The polychromatic beam 121 forms a spot 125 that illuminates several nanoparticles 114, including at least one red-scattering nanoparticle 114a and at least one blue-scattering nanoparticle 114b. Red light 123a scatters off the red-scattering nanoparticle 114a to produce scattered red light 111a, and blue light 123b scatters off the blue-scattering nanoparticle 114b to produce scattered blue light 111b. Observers 1 and 3 looking at the screen 110 may perceive the scattered red light 111a and scattered blue light 111b as a purple spot on the screen 110.

Together, the size of the focused spot and the nanoparticle density set the display's pixel size, or resolution: as long as the focused spot is large enough to encompass at least one nanoparticle 114, it should produce scattered light visible to an observer. Unlike conventional displays, however, the pixel size of the transparent scattering display 100 can be adjusted on the fly by simply increasing or decreasing the focused spot size, e.g., using a zoom lens. In addition, the focused spot size can be very small, e.g., on the order of the illumination wavelength, for resolution much finer than the finest resolution achievable with conventional pixelated displays. (In some cases, however, the beam-steering element's scanning capability may limit the number of resolvable spots on the display if the number of distinct scan angles/positions is smaller than the display's area divided by the focused spot size.)

Figure 1D:
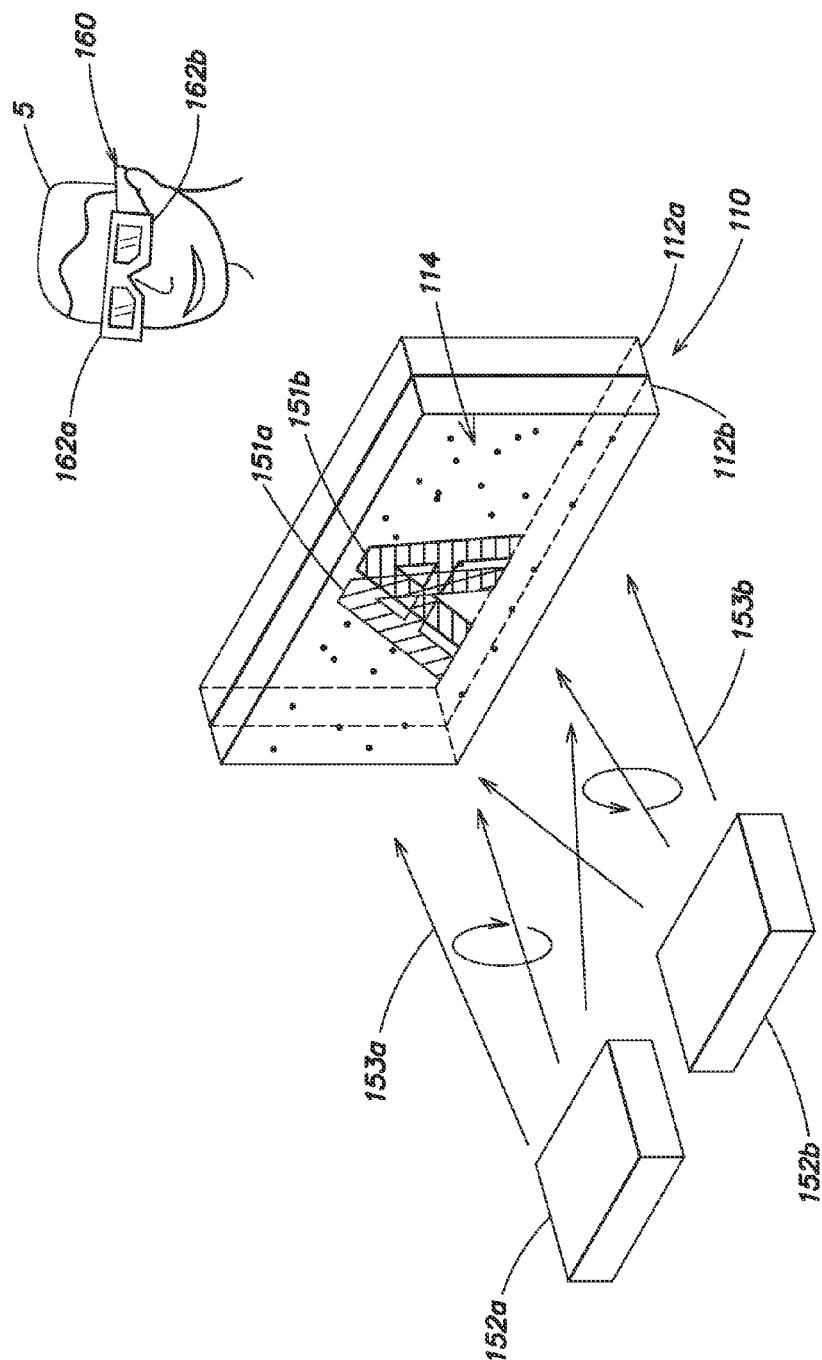
FIG. 1D illustrates the screen of the transparent scattering display shown in FIG. 1A used for viewing three-dimensional images.

FIG. 1D shows how the transparent screen 110 can be used to achieve a three-dimensional (3D) viewing effect using polarization multiplexing. A first polarized light source 152a projects a first polarized image 151a onto the screen 110 with a first polarized beam 153a (e.g., a right-handed circularly polarized beam as shown in FIG. 1D). A second polarized light source 152b projects a second polarized image 151b onto the screen 110 with a second polarized beam 153b (e.g., a left-handed circularly polarized beam as shown in FIG. 1D). An observer 5 views the superimposed image with eyeglasses 160 that filter right-handed circular polarization for one eye and left-handed circular polarization for the other eye with filters 162a and 162b. Each eye perceives a different image, so a 3D effect can be achieved. This works on the transparent screen 110 because most of the scattered light comes from a single-scattering event rather than multiple scattering, and so the scattered light retains the polarization state of the incident light.

Those of skill in the art will readily understand that the display 100 can use other architectures instead of those shown in FIG. 1A. For instance, the light source 120 may include LEDs that emit red, green, and blue light instead of laser diodes. The red, green, and blue beams may be steered independently, e.g., by using a separate beam-steering element for each beam. The display can also use a single beam-steering element to steer pulsed monochromatic beams in a repetitive sequence, e.g., the red beam 121a, then the green beam 121b, and then the blue beam 121c. The beam-shaping optics 124 and the beam-combining optics 126 can also be selected depending on the desired spot size (display resolution), working distance (distance from the light source 120 to the screen 110), etc.

Multi-Layer Transparent Scattering Displays

Figure 2:
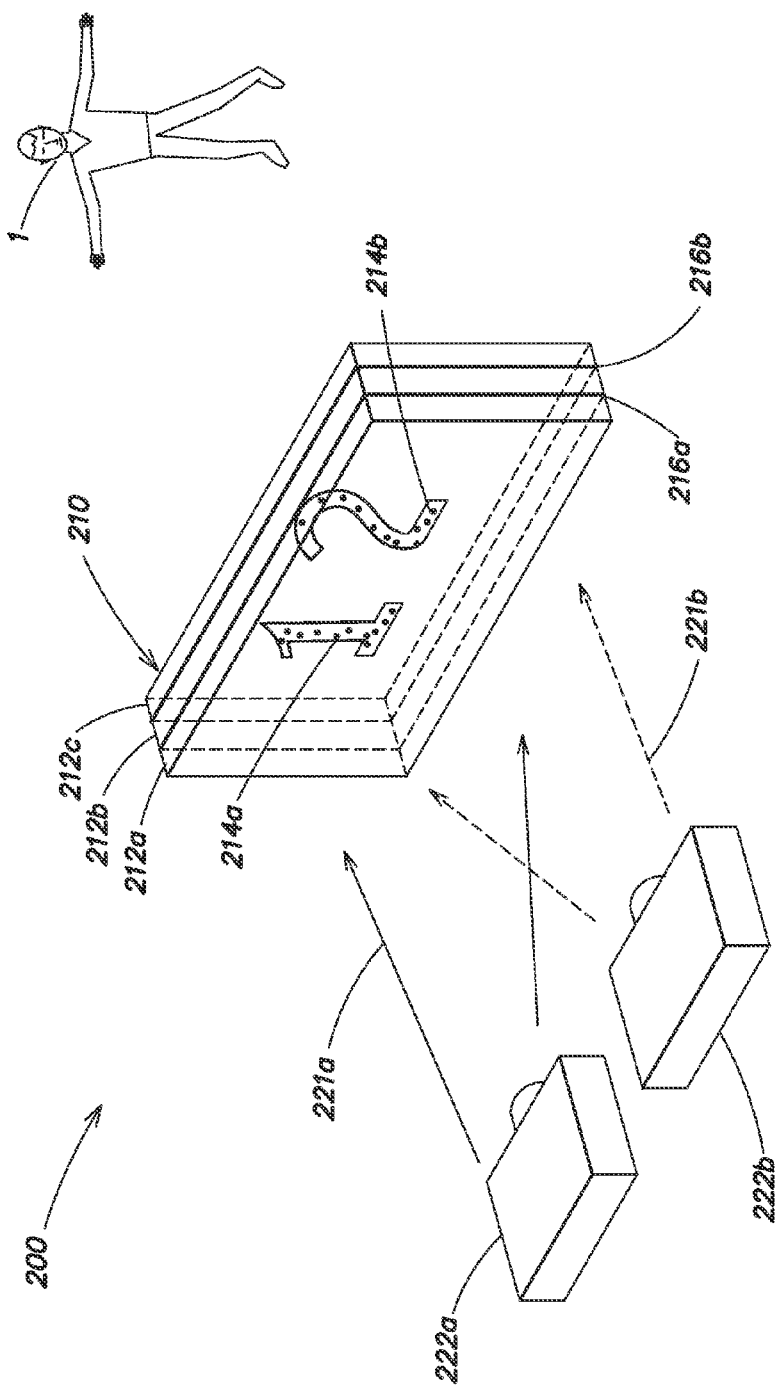
FIG. 2 is a schematic drawing of a multi-layer transparent scattering display with predetermined patterns of scattering nanoparticles.

FIG. 2 illustrates a multi-layer transparent scattering display 200 that uses selectively scattering nanoparticles 214 to produce images visible to observers in front of and behing the screen. Like the display 100 shown in FIG. 1A, the multi-layer transparent scattering display 200 includes a screen 210 and light sources 222a and 222b (collectively, light sources 222). In this case, however, the screen 210 includes three substantially transparent substrates: a first substrate 212a, a second substrate 212b, and third substrate 212c (collectively, substrates 212). These substrates 212 may be made of glass, plastic, acrylic, or any other suitable material. Their thickness and rigidity/flexibility may be selected based on the application as explained above.

The screen 210 also includes two nanoparticle layers: a first nanoparticle layer 216a, which includes nanoparticles 214a that scatter light at a first wavelength (e.g., 460 nm), and a second nanoparticle layer 216b, which includes nanoparticles 214b that scatter light at a second wavelength (e.g., 650 nm) (collectively, nanoparticles 214 and nanoparticle layers 216). A given nanoparticle layer 216 may include more than one type of nanoparticle 214 (e.g., as in the display 100 of FIG. 1A). If desired, the nanoparticles 214 may be deposited or arranged between the substrates 216 in predetermined patterns. For example, the nanoparticles 214 may be arranged to form logos, letters, numbers (e.g., the numbers "1" and "2" as shown in FIG. 2), or other patterns that can be displayed by illuminating the screen 210 with light at the scattering wavelength(s).

FIG. 2 also shows a pair of light sources 222a and 222b disposed to illuminate the screen 210 with diverging beams 221a and 221b (collectively, diverging beams 221) of monochromatic light. In this example, the first light source 222a emits a first diverging beam 221a at wavelength scattered by the nanoparticles 214a in the first nanoparticle layer 216a, and the second light source 222b emits a second diverging beam 221b at wavelength scattered by the nanoparticles 214b in the second nanoparticle layer 216b. Illuminating the entire screen 210 with the diverging beams 221 causes images to appear on the screen 210 in the shapes of the patterns formed by the nanoparticles. The diverging beams 221 can be turned on and off (modulated) to produce images that appear to flicker, move, change color, etc. as desired.

Scattering Nanoparticles

The nanoparticles in the transparent scattering displays shown in FIGS. 1A and 2 have scattering cross sections that are sharply peaked at particular wavelengths and substantially zero throughout the rest of the visible spectrum. They have also have absorption cross sections that are substantially zero throughout the visible spectrum. This combination of selective scattering and low absorption, combined with the substrates' substantial transparency throughout the visible spectrum, means that the display itself can be substantially transparent.

There are several ways to achieve wavelength-selective narrowband scattering (resonant scattering) in nanoparticles, including surface plasmonic resonances in metal-coated nanoparticles, resonant features (e.g., cavities), and Fano resonances, which are resonances that exhibit asymmetric profiles due to interference between the resonant and background scattering probabilities. Other particles, such as high-index dielectric nanoparticles, and other types of resonances, such as higher-order resonances, may also exhibit suitable wavelength-selective scattering. Moreover, the size, shape, and composition of the nanoparticles can be selected to achieve particular scattering wavelengths, bandwidths, and bandshapes.

As understood by those of skill in the art, when a particle is much smaller than the wavelength of incident light (e.g., a nanoparticle), the particle experiences a local electromagnetic field that is substantially constant in space. As a result, the optical response of this small particle can be determined from the corresponding electrostatic problem. This is called the quasi-static approximation (also known as the electrostatic approximation or dipole approximation).

The quasi-static approximation can be used to estimate the sharpness of the scattering cross-section in the localized surface plasmon resonances of small metallic particles. This derivation is general and applies to arbitrary particle shapes, including but not limited to spheres, ellipsoids, oblate spheroids, and prolate spheroids. In the quasi-static approximation, the scattering cross-section $\sigma_{sca}$ averaged over angle and polarization of the incoming light can be written as:

$$\langle \sigma_{sca} \rangle = \frac{k^4}{18\pi} \sum_{j=1,2,3} |\alpha_j(\varepsilon)|^2, \quad (1)$$

where the angle brackets denote an average over angle and polarization, $k=2\pi\sqrt{\epsilon_m}/\lambda$ is the wavenumber in the surrounding medium (whose dielectric constant $\epsilon_m$ is purely real and positive), and $\alpha_1$, $\alpha_2$, and $\alpha_3$ are the particle's static polarizabilities in three orthogonal directions. The particle can be a uniform material (e.g., a solid sphere) or a composite of multiple materials (e.g., a core-shell structure).

One way to achieve wavelength-selective scattering is to use the localized surface plasmon resonances in metallic nanoparticles. Without being bound by any particular theory, those skilled in the art understand that a metallic nanoparticle can support a surface plasmon because its dielectric function will have a negative real part at some wavelength range. In particular, a metallic nanoparticle supports a localized surface plasmon resonance that occurs approximately at the wavelength $\lambda_0$ for which $$\frac{1}{\alpha_j(\text{Re}(\varepsilon(\lambda_0)))} = 0. \quad (2)$$

(For a sphere, this condition can be simplified to $\text{Re}(\in(\lambda_0)) = -2 \in_m$.) Near the resonance, the static polarizability $\alpha_j$ provides the dominant contribution to the averaged scattering cross-section, so the ratio between the on-resonance (at $\lambda_0$) and off-resonance (at $\lambda_0+\Delta\lambda$, for a small $\Delta\lambda$ of interest) scattering cross-sections is approximately $$\frac{\langle\sigma_{sca}(\lambda_0)\rangle}{\langle\sigma_{sca}(\lambda_0+\Delta\lambda)\rangle} \approx \left|\frac{\alpha_j(\varepsilon(\lambda_0))}{\alpha_j(\varepsilon(\lambda_0+\Delta\lambda))}\right|^2. \quad (3)$$

This expression can be simplified by writing the polarizability as a rational function and taking the changes in the real and imaginary components of the permittivity with $\Delta\lambda$ to be small relative to their on-resonance values. Analytical expressions for the polarizability of spheres, coated spheres, ellipsoids, and coated ellipsoids appear in C. F Bohren and D. R. Huffman, *Absorption and Scattering of Light by Small Particles* (Wiley, New York, 1998), which is incorporated herein by reference in its entirety. All of these analytical expressions may take the form of rational functions. For more arbitrary geometries, the polarizability can often be locally approximated as a rational function near the resonance.

Applying these simplifications to Equation (3) yields the following expression for the ratio between the on-resonance (at $\lambda_0$) scattering cross-section and the off-resonance (at $\lambda_0+\Delta\lambda$, for a small $\Delta\lambda$ of interest) for a small particle (e.g., diameter<<wavelength) characterized by a dielectric function $\in$:

$$\frac{\sigma_{sca}(\lambda_0)}{\sigma_{sca}(\lambda_0+\Delta\lambda)} \approx 1 + \left|\frac{\text{Re}[\varepsilon(\lambda_0+\Delta\lambda)-\varepsilon(\lambda_0)]}{\text{Im}[\varepsilon(\lambda_0)]}\right|^2. \quad (4)$$

The derivation leading to Equation (4) applies to arbitrary particle shapes, and assumes only that the particle is much smaller than the wavelength $\lambda_0$ and that $\Delta\lambda$ is small enough that the permittivity does not change much. Equation (4) applies to localized surface plasmon resonances, but not necessarily to other types of resonances.

For strong wavelength-selective scattering, the on-resonance scattering cross section, $\sigma_{sca}(\lambda_0)$, should be much larger than the off-resonance scattering cross section, $\sigma_{sca}(\lambda_0+\Delta\lambda)$, which that the ratio given by Equation (4) should be (much) greater than 1. To achieve a large ratio (e.g., much greater than 1), Equation (4) suggests that the nanoparticle material should be characterized by a dielectric function with a small imaginary component, $\text{Im}(\in)$, and a fast-changing real component, $\text{Re}(\in)$, near the resonance wavelength, $\lambda_0$. Materials whose dielectric functions have small imaginary components and fast-changing real components near a particular resonance wavelength include Drude metals with negligible loss.

Figure 3:
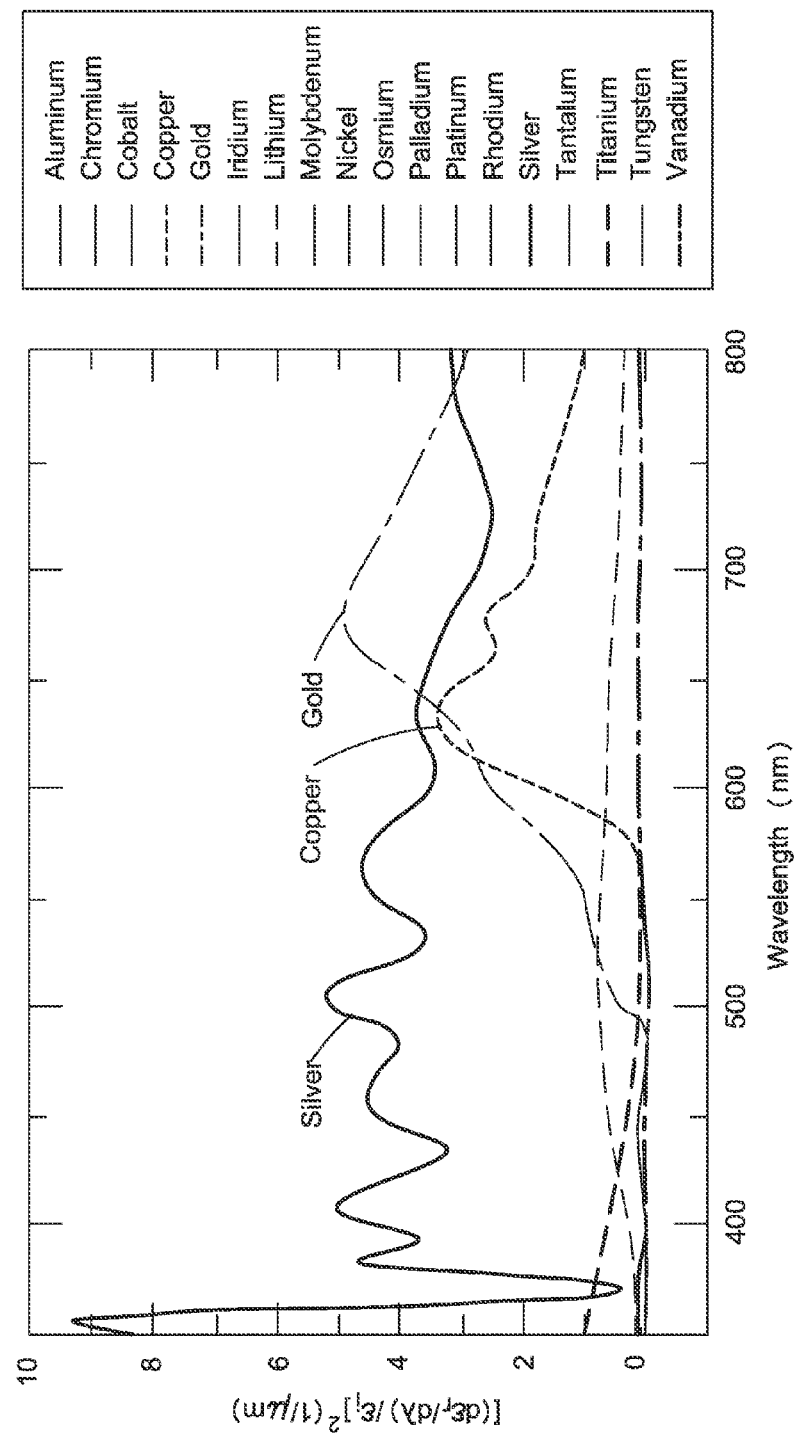
FIG. 3 is a plot indicative of wavelength-selective scattering performance derived from the dielectric functions of various materials suitable for making scattering particles.

FIG. 3 is a plot of the square of the ratio of the real part of the derivative of the dielectric function with respect to wavelength to the imaginary part of the dielectric function, $\eta=|\text{Re}(d\in/d\lambda)/\text{Im}(\in)|^2$, for different metals. In other words, $\eta$ provides an estimate of a material's performance in a scattering nanoparticle, with higher values indicating higher scattering and/or lower absorption. FIG. 3 shows that realistic metals tend to be lossy and to deviate significantly from the Drude model in the visible spectrum. Within most of the visible spectrum, silver has the highest value of $\eta=|\text{Re}(d\in/d\lambda)/\text{Im}(\in)|^2$ among the common metals, and is thus suitable for use in a scattering nanoparticle. Other materials suitable for making scattering nanoparticles include but are not limited to gold and copper.

As mentioned above, a nanoparticle suitable for use in a transparent scattering display should have a uniformly low absorption cross-section $\sigma_{abs}$ across the visible spectrum, and a high scattering cross section $\sigma_{sca}$ at the resonance wavelength $\lambda_0$ with low scattering cross section $\sigma_{sca}$ elsewhere in the visible spectrum. These parameters can be used to define the following figure of merit (FOM):

$$FOM = \frac{\sigma_{sca}(\lambda_0)}{2\overline{\sigma_{sca}}+\max\{\sigma_{abs}\}}, \quad (5)$$

where the overline and the symbol max { ... } denote the mean and the maximum, respectively, in the visible spectrum (from 390 nm to 750 nm). The FOM is defined as a ratio, instead of in terms of the absolute values of the particle's scattering and absorption cross sections, because the screen's total scattering and absorption can be set by picking an appropriate areal density of the nanoparticles on the screen. The number 2 is an empirically determined weight that provides a good balance between optimizing for sharp scattering and for low absorption. (Other empirically determined weights (e.g., a number in the range of 1.5-2.5) may work as well.) And using the maximum absorption cross section gives an FOM for a flat absorption spectrum for a colorless transparent screen instead of a peaked absorption cross section for a tinted transparent screen. If desired, the FOM can be adjusted to include a wavelength-dependent weight on the scattering and absorption cross sections to account for the human eye's spectral sensitivity.

If desired, the FOM defined in Equation (5) can be used to determine a nanoparticle's size and composition for a given scattering wavelength, scattering cross section, and absorption cross section. More specifically, a nanoparticle can be designed numerically by combining Mie-theory calculation of the scattering and absorption cross sections with a nonlinear optimization engine that uses an appropriate figure of merit, such as the FOM given in Equation (5). Other suitable figures of merit may be defined as the average scattering cross section over a specified narrowband region divided by the average extinction cross section across the whole visible spectrum or by minimizing the full width at half maximum (FWHM) of the scattering cross section times the average extinction cross section across the whole visible spectrum. Nonlinear optimization based on a figure of merit can be applied to any material, any geometry, and other types of resonances. This FOM-based optimization can also be used to design nanoparticles with multiple scattering cross sections in the visible spectrum and/or scattering cross sections with different spectral widths.

Figures 4A, 4B, 4C:
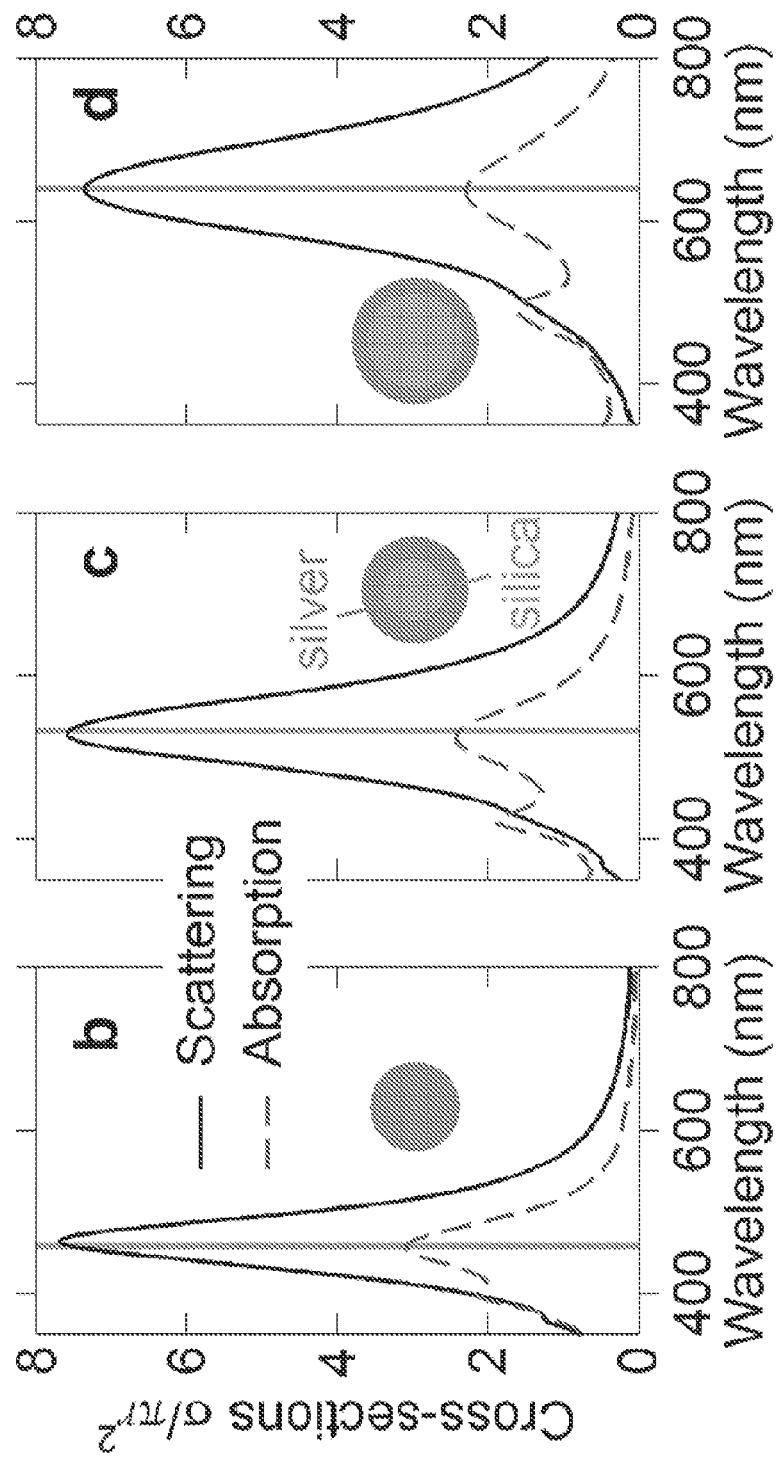
FIG. 4A is a plot of the scattering cross section (solid line) and the absorption cross section (dashed line) versus wavelength for a silver-coated silica nanoparticle (inset) that strongly scatters blue light and is suitable for use in a transparent scattering display.
FIG. 4B is a plot of the scattering cross section (solid line) and the absorption cross section (dashed line) versus wavelength for a silver-coated silica nanoparticle (inset) that strongly scatters green light and is suitable for use in a transparent scattering display.
FIG. 4C is a plot of the scattering cross section (solid line) and the absorption cross section (dashed line) versus wavelength for a silver-coated silica nanoparticle (inset) that strongly scatters red light and is suitable for use in a transparent scattering display.

FIGS. 4A-4C are plots of scattering cross sections (solid lines) and absorption cross sections (dashed lines) versus wavelength for spherical nanoparticles with shells made of silver and cores made of silica generated using the nonlinear optimization process described above. The particles, which are shown in the insets of FIGS. 4A-4C, can be synthesized, for example, using the Stöber process, are assumed to be embedded in a transparent medium with a refractive index n=1.44, which is typical of a polymer matrix. The scattering and absorption cross-sections shown in FIGS. 4A-4C were calculated with the transfer matrix method, using n=1.45 for silica and experimental values for the wavelength-dependent complex permittivity of silver. The particle size distribution is assumed to follow a Gaussian distribution with a standard deviation equal to about 10% of the mean. Using the FOM from Equation (5) gives a core radius and shell thickness by performing a global optimization via a multi-level, single-linkage algorithm implemented, e.g., within the nonlinear optimization package NLopt (available at http://ab-initio.mit.edu/wiki/index.php/NLopt).

FIG. 4A shows a silica nanosphere, with a radius of about 1.3 nm, that is coated with a 30.8 nm thick silver shell and scatters blue laser light ($\lambda_0$=458 nm). FIG. 4B shows a silica nanosphere, with a radius of about 22.2 nm, that is coated with a 15.8 nm thick silver shell and scatters green laser light ($\lambda_0$=532 nm). And FIG. 4C shows a silica nanosphere, with a radius of about 34.3 nm, that is coated with a 11.0 nm thick silver shell and scatters red laser light ($\lambda_0$=640 nm). The FWHM of the peaks in FIGS. 4A, 4B, and 4C are about 66 nm, about 62 nm, and about 69 nm, respectively, and the FOMs are 1.01, 0.91, and 0.81, respectively. Even at these FWHM, a transparent substrate that hosts any of the nanoparticles shown in FIGS. 4A-4C is substantially transparent except at the resonance wavelength(s).

FIGS. 5A and 5B are plots of the calculated scattering and absorption cross-sections of a titanium dioxide nanoshell that scatters blue laser light at $\lambda$=458 nm and a silicon nanoshell that scatters green laser light at $\lambda_0$=532 nm, respectively. The calculations take into account a ±10% random distribution in the shell thickness. (Without being bound by any particular theory, the quasi-static approximation may not describe these nanoshell resonances accurately because the nanoshells are relatively large.)

The titanium dioxide nanoshell in FIG. 5A has an inner radius of 25.5 nm, an outer radius of 70.1 nm, and a FOM=1.76. The silicon nanoshell in FIG. 5B has an inner radius of 43.8 nm, an outer radius of 68.2 nm, and a FOM=1.14. The nanoshells' resonances exhibit relatively low absorption loss, but the index contrast should be high enough to provide sufficient confinement for the resonances. In FIGS. 5A and 5B, for example, the nanoshells' cores and surrounding media are assumed to have refractive index n=1. In practice, the cores and surrounding media may include low-index materials, such as transparent aerogels with transmission lengths of up to 60 mm.

Figure 6:
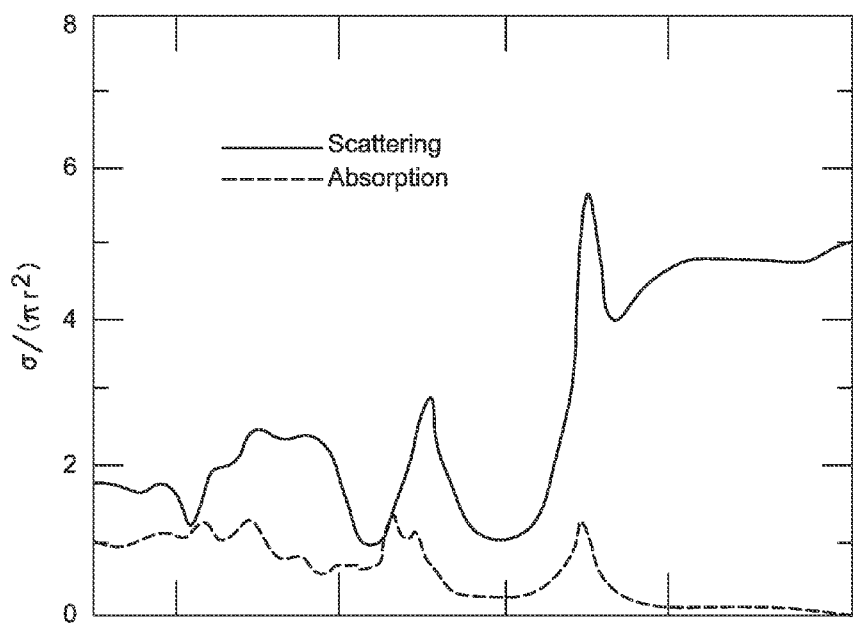
FIG. 6 is a plot of the scattering cross section versus wavelength for a solid silicon nanosphere with a radius of r=115 nm.

FIG. 6 is a plot of the scattering cross section for a silicon nanoparticle with a radius of about 115 nm. The scattering cross section has peaks at wavelengths corresponding roughly to blue, green, and red. The silicon nanoparticle also scatters light in the near infrared portion of the electromagnetic spectrum, but because humans cannot see infrared light, the infrared scattering is unlikely to affect the display's performance.

Making a Transparent Scattering Display

FIGS. 7A-7C illustrate different processes for making screens with scattering nanoparticles for use in transparent scattering displays, e.g., as shown in FIGS. 1A and 2. The nanoparticles 714 may have shapes, sizes, and/or compositions selected to provide scattering at particular wavelengths (e.g., wavelengths corresponding to red, blue, and green). The nanoparticles 714 can also be synthesized with existing techniques including but not limited to wet chemistry, physical vapor deposition, ion implantation, and fiber drawing. If desired, the nanoparticles' outer surfaces can be treated (e.g., with polyvinylpyrrolidone (PVP)) to prevent undesirable aggregation (clustering, described below), chemical reactions with the host (substrate) material, or both. The nanoparticle solution may be diluted to a reduce the nanoparticle concentration, to improve the coating's deposition characteristics, or both.

The process 700 shown in FIG. 7A involves dissolving nanoparticles 714 in an appropriate solvent 715, such as polyvinyl alcohol (PVA), which dissolves in water, to form a nanoparticle solution (step 702). If desired, the nanoparticle solution can be mixed with a polymer powder to form a polymer/nanoparticle solution. Alternatively, the nanoparticles can also be dissolved into a liquid polymer matrix to form a polymer/nanoparticle solution that is deposited onto one surface of a transparent subtrate 712 and allowed to dry slowly.

The nanoparticles can be coated onto the transparent substrate 712, which can made of glass, plastic, acrylic, or any other suitable transparent material, by depositing the nanoparticle solution onto the substrate's surface (step 704). Making the coating uniform, both in thickness and surface appearance, may reduce or eliminate undesired scattering. To achieve a uniform thickness, the nanoparticle solution may be spin-coated, painted, or otherwise deposited onto the substrate's surface to form the coating. For example, the nanoparticle solution may be painted onto the substrate in the form of liquid, foam, or spray. Such paint can be sprayed onto a transparent surface, without the need for any special facility, and so can be done easily at almost any occasion. If desired, another transparent substrate (not shown) may be placed or pressed onto the coated surface of the first substrate 712 to remove bubbles in the coating, reduce the coating's surface roughness, or both. The coating is allowed to dry (step 706) through gentle evaporation (e.g., via dessication in a vacuum chamber) to form a uniform surface. If desired, additional coats (e.g., containing different types of nanoparticles) may be deposited onto the dried coating or onto other substrate surfaces.

In some cases, the nanoparticle solution is printed onto the substrate surface to produce a uniform layer of nanoparticles. Suitable printing techniques include but are not limited to screen printing, inkjet printing, rotogravure printing, and flexography printing. Printing is particularly useful for depositing nanoparticles onto flexible substrates.

If desired, the nanoparticle solution may be printed or otherwise deposited onto predetermined portions of the substrate surface, e.g., to form patterns like those shown in FIG. 2, using a mask or other appropriate technique. For instance, if the nanoparticle solution is an aqueous solution, the substrate surface may be selectively coated with hydophilic and/or hydrophobic coatings to attract and repel, respectively, the nanoparticle solution.

FIG. 7B illustrates another process 730 for making a screen suitable for use in a transparent display. In this process 730, the substrate is softened to form a softened substrate or melted to form a liquid substrate (step 732). The nanoparticles are pressed into the softened substrate or dissolved into the liquid substrate (step 734), then allowed to harden into a screen that includes nanoparticles embedded within the substrate (step 736). For instance, the nanoparticles can be dissolved directly into molten glass, molten/liquid plastic, or molten/liquid acrylic to form a doped substrate material. The doped substrate material can then be extruded, molded, or otherwise formed into a transparent board doped with nanoparticles using standard glass (or plastic) making techniques.

FIG. 7C illustrates yet another process 760 for making a screen suitable for use in a transparent display. In this process 760, one or more nanoparticles are suspended in a liquid polymer matrix or mixed with a dry polymer and a solvent to form a nanoparticle suspension (step 762). In step 764, the nanoparticle suspension is injected or wicked into a cavity formed between a pair of substrates or within a single substrate, e.g., using capillary action. The cavity is sealed in step 766 to prevent the suspension from escaping, and the nanoparticle suspension is cured, e.g., using ultraviolet light, to prevent the nanoparticles from settling.

Nanoparticle Clustering

In some cases, the nanoparticles in solution can cluster together to produce undesired shifts in the scattering wavelength. Without being bound by any particular theory, it appears that osmatic pressure, capillary forces, and van der Waals forces could each play a role in nanoparticle clustering. Osmatic pressure yields short-range (sticking) attraction, but may not apply in solvents with relatively low nanoparticle concentrations (e.g., volume fractions of about $2 \times 10^{-5}$ or less). Capillary forces can be reduced or eliminated by lowering the interfacial energy between the nanoparticle surface and the solvent (e.g., PVA), for example, by coating the particles with a polar coating like PVP.

Van der Waals forces may be more likely to cause clustering than osmatic pressure or capillary forces. The potential energy associated with the van der Waals force for a pair of spheres with radius R and separated by a distance D is $$W(D) = -AR/(12D),$$

where A is a constant. For silver nanospheres in water, $A = 4 \times 10^{-19}$, which, at a separation distance $D = 200$ nm, corresponds to an attractive energy roughly equal to kT (Boltzmann's constant times temperature, or the thermal excitation energy). Decreasing the nanosphere density reduces the probability that a given pair of nanospheres will be separated by 200 nm or less, which in turn reduces the probability that van der Waals attraction will lead to clustering:

| Nanosphere Density | Probability of <200 nm Nearest Neighbor |
|---|---|
| 2.0 μg/L | 1.7% |
| 1.0 μg/L | 0.8% |
| 0.5 μg/L | 0.4% |

FIGS. 8A-8C illustrate the effects of nanoparticle clustering. FIGS. 8A and 8B show the experimental extinction cross sections ($\sigma_{ext} = \sigma_{sca} + \sigma_{abs}$; solid lines) and theoretical extinction cross sections (dashed lines) versus wavelength for spherical silver nanoparticles in PVA. The widths of the experimental curves indicate plus/minus one standard deviation. The nanoparticle concentration is 5 μg/mL in FIG. 8A and 10 μg/mL in FIG. 8B, which shows a larger extinction cross sections near 620 nm (as indicated by the arrow). FIG. 8C is a plot of the theoretical extinction cross-section spectrum of two silver nanoparticles that stick together (e.g., as shown in the TEM image in the inset of FIG. 9A) calculated for polarization along the axis of alignment. It shows that the clustered nanoparticles scatter light strongly at 620 nm, which suggests that the extra peak in FIG. 8B is due to nanoparticle clustering at the higher nanoparticle concentration.

Exemplification

The following example is intended to illustrate aspects of the present technology without limitation of the claims.

In one example, a transparent display capable of displaying blue images was made and tested as follows. FIG. 4A shows that a nanoparticle that scatters blue laser light has a negligible silica core, so the transparent display was made using solid spherical silver nanoparticles (e.g., from nanoComposix) for simplicity. The nanoparticles were hosted in a transparent polymer matrix by adding PVA (e.g., from Sigma-Aldrich) into an aqueous solution of silver nanoparticles (nanoparticle density 0.01 mg/mL). The liquid was mixed thoroughly, poured onto one surface of a piece of glass that measured 25 cm by 25 cm, desiccated in a vacuum chamber, and allowed to dry at room temperature for 40 hours. This yielded a transparent screen with a film of nanoparticle-doped PVA that was 0.46 mm thick, with almost no air bubbles inside, on a transparent substrate.

Figures 9A, 9B:
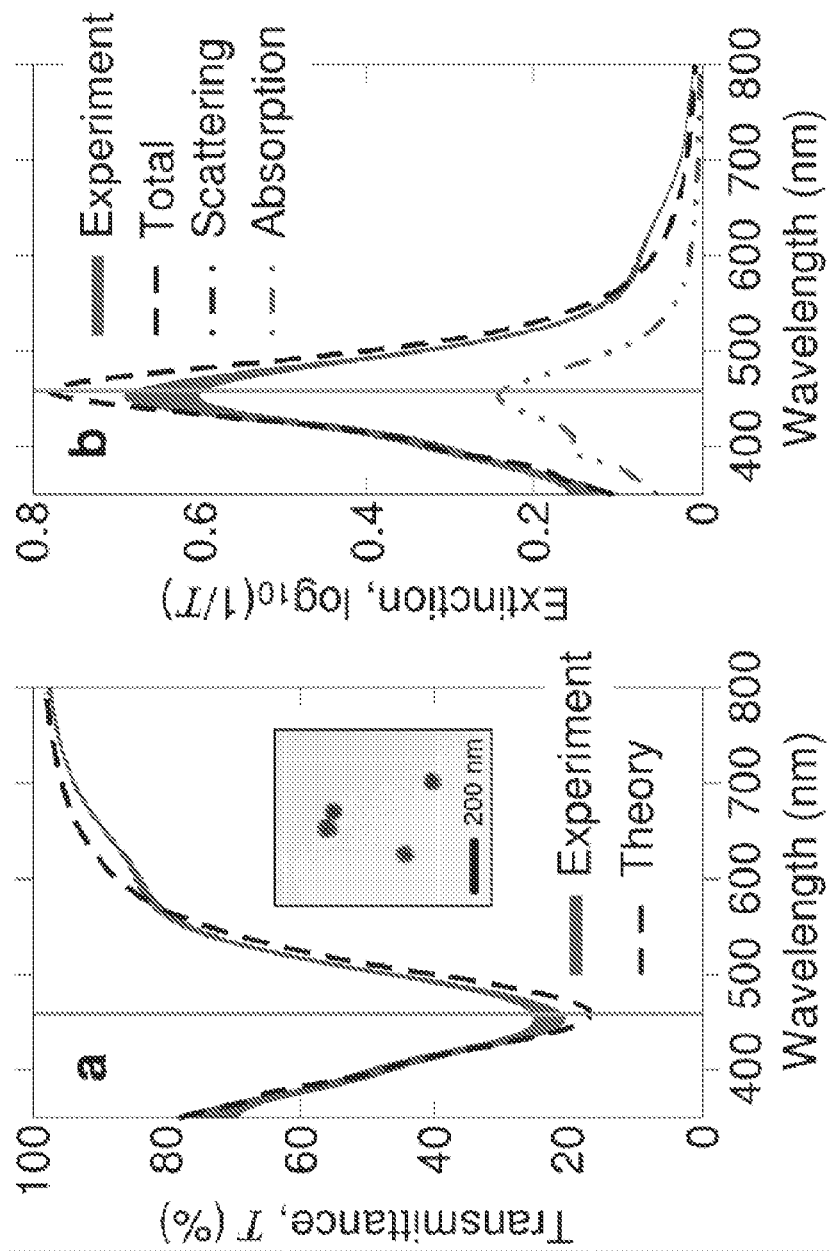
FIG. 9A is a plot of the measured transmittance spectrum (solid line) and predicted transmittance spectrum (dashed line) for silver nanoparticles with a diameter of 62 nm±4 nm embedded in a PVA film (inset) as in a transparent scattering display.
FIG. 9B is a plot the measured extinction ratio (solid line), predicted extinction ratio (dashed line), and predicted contributions from scattering (dot-dashed line) and absorption (dot-dot-dashed line) for the silver nanoparticles of FIG. 9A.

FIGS. 9A and 9B are plots of the transmittance and extinction, respectively, versus wavelength for the film of nanoparticle-doped PVA. (The inset of FIG. 9A shows a transmission electron microscope (TEM) image of the measured nanoparticles, which have a diameter of 62 nm±4 nm.) Solid lines indicate measured values and dashed lines indicate calculated values. The width of the solid lines indicates plus/minus one standard deviation. FIG. 9B also shows theoretical values for extinction due to scattering (dot-dash) and absorption (dot-dot-dash). The transmittance falls to about 20% at the resonance wavelength and is close to 100% elsewhere in the visible sprectrum. Both plots indicate very good agreement between the experiment and the theory, with a slight discrepancy near 620 nm that can be explained by the occasional clustering of the nanoparticles (see FIGS. 8B and 8C). FIG. 9B also shows that the theory predicts that the majority of the extinction at the resonance wavelength comes from scattering rather than from absorption.

Figure 10A:
FIG. 10A is a color photograph the Massachusetts Institute of Technology (MIT) logo projected onto the upper portion of a transparent scattering display placed in front of three coffee mugs with the MIT logo.
Figure 10B:
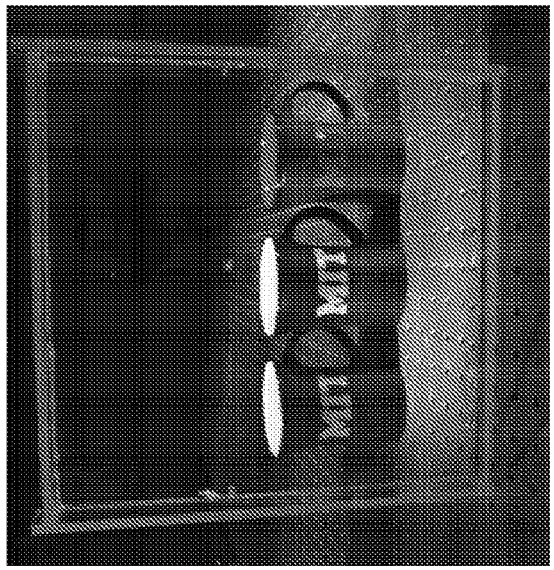
FIG. 10B is a color photograph of the MIT logo projected onto a regular piece of glass in front of three coffee mugs with the MIT logo.

FIG. 10A shows a color photograph of the transparent screen used as a transparent scattering display, which sits in front of three colored coffee mugs. The photograph shows a blue MIT logo projected onto this screen using a low-power laser projector (e.g., MicroVision SHOWWX+, maximum output power 1 mW), with a GaN laser diode that emits light at a wavelength of 458 nm±2 nm. The projected logo was visible from all directions because it was formed by light scattering. As a comparison, FIG. 10B is a color photograph that shows the same logo projected onto a piece of regular glass in front of the same coffee mugs shown in FIG. 10A. No image appears in FIG. 10B because the glass is transparent at the 458 nm wavelength of the projected blue laser light. FIGS. 10A and 10B also show that the screen is nearly as transparent as the glass: the colored coffee mugs appear properly behind both the screen and the glass.

Figure 11A:
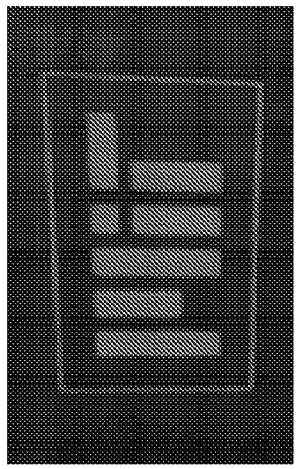
FIG. 11A is a color photograph of the MIT logo projected onto a transparent scattering display with a black backing.
Figure 11B:
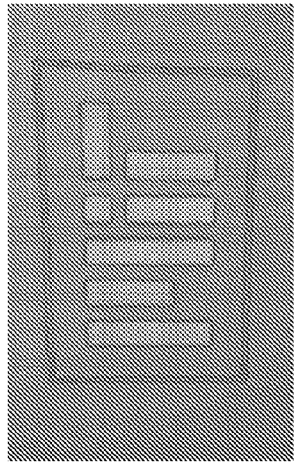
FIG. 11B is a color photograph of the MIT logo projected onto a piece of white paper.

FIGS. 11A and 11B are color photographs of the MIT logo projected onto the transparent screen and a piece of white paper, respectively. Both photographs were captured with the same lighting condition and exposure and converted to JPEG files directly from the raw image files without any editing. FIGS. 11A and 11B show that the image projected image onto the screen is slightly dimmer than the image on the paper, but the screen achieves better image contrast than the paper because it scatters less ambient light than the paper. (Unlike the paper, the screen does produce any diffuse scattering.) The black backing behind the transparent screen in FIG. 11A also improves the contrast ratio.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments (e.g., of designing and/or operating transparent displays) may be implemented using hardware, software, or a combination thereof. When implemented in software, the software code can be executed on any suitable processor or collection of processors, whether provided in a single computer or distributed among multiple computers.

Further, it should be appreciated that the present displays and methods of making and operating displays may be used in conjunction with a computer, which may be embodied in any of a number of forms, such as a rack-mounted computer, a desktop computer, a laptop computer, or a tablet computer. For instance, the controller 140 shown in FIG. 1A may be implemented as a computer, smart phone, or other processor-based device. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

A flow diagram is used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A transparent display comprising:
   a transparent substrate;
   at least one light source, in optical communication with the transparent substrate, to illuminate the transparent substrate with at least one monochromatic beam at a first wavelength in visible spectrum; and
   at least one nanoparticle, disposed on the transparent substrate, to scatter the at least one monochromatic beam in the visible spectrum and to transmit ambient light at other wavelengths in the visible spectrum.

2. The transparent display of claim 1, wherein the transparent substrate has a transmittance of about 90% to about 100% at wavelengths from about 390 nm to about 760 nm.

3. The transparent display of claim 1, wherein the transparent substrate comprises at least one of glass, plastic, polymer, and acrylic.

4. The transparent display of claim 1, wherein the at least one light source comprises:
   a first light source to emit a first monochromatic beam having a first center wavelength between about 390 nm and about 490 nm;
   a second light source to emit a second monochromatic beam having a second center wavelength between about 490 nm and about 580 nm; and
   a third light source to emit a third monochromatic beam having a third center wavelength between about 580 nm and about 760 nm.

5. The transparent display of claim 4, wherein the at least one nanoparticle has a scattering cross section with a peak having a full-width half-maximum of about 1 nm to about 70 nm that spans one of the first center wavelength, the second center wavelength, and the third center wavelength.

6. The transparent display of claim 4, wherein the at least one nanoparticle has a scattering cross section with:
   a first peak having a first full-width half-maximum (FWHM) of about 1 nm to about 70 nm overlapping the first center wavelength,
   a second peak having a second FWHM of about 1 nm to about 70 nm overlapping the second center wavelength, and
   a third peak having a third FWHM of about 1 nm to about 70 nm overlapping the third center wavelength.

7. The transparent display of claim 4, wherein the at least one nanoparticle comprises:
   a first nanoparticle having a first scattering cross section with a first peak overlapping the first center wavelength;
   a second nanoparticle having a second scattering cross section with a second peak overlapping the second center wavelength; and a third nanoparticle having a third scattering cross section with a third peak overlapping the third center wavelength.

8. The transparent display of claim 1, wherein the at least one nanoparticle comprises:
 a first nanoparticle comprising a first silica sphere having a diameter of about 17.7 nm and a first layer of silver, deposited on the first silica sphere, with a thickness of about 10.4 nm;
 a second nanoparticle comprising a second silica sphere having a diameter of about 25 nm and a second layer of silver, deposited on the second silica sphere, with a thickness of about 6.9 nm; and
 a third nanoparticle comprising a silver sphere having a diameter of about 25.1 nm.

9. The transparent display of claim 1, wherein the at least one nanoparticle scatters about 90% to about 100% of incident light at a wavelength of the at least one monochromatic beam.

10. The transparent display of claim 1, wherein the at least one nanoparticle comprises a plurality of nanoparticles deposited in a predetermined pattern on the transparent substrate.

11. The transparent display of claim 1, further comprising:
 a beam-steering element to direct the at least one monochromatic beam to different areas of the transparent substrate so as to illuminate different ones of the at least one nanoparticle.

12. A method of operating a transparent display comprising at least one nanoparticle disposed on a transparent substrate, the method comprising:
 illuminating the at least one nanoparticle with at least one monochromatic beam at a first wavelength in visible spectrum so as to scatter at least a portion of the at least one monochromatic beam in the direction of a viewer, the at least one nanoparticle transmitting ambient light at other wavelengths in the visible spectrum.

13. The method of claim 12, wherein the at least one nanoparticle comprises a first nanoparticle disposed on a first portion of the transparent substrate and a second nanoparticle disposed on a second portion of the transparent substrate, and further comprising:
 generating the at least one monochromatic beam; and
 directing the at least one monochromatic beam to illuminate the first nanoparticle; and
 directing the at least one monochromatic beam to illuminate the second nanoparticle.

14. The method of claim 12, wherein illuminating the at least one nanoparticle with the at least one monochromatic beam comprises:
 illuminating the at least one nanoparticle with a first monochromatic beam having a first center wavelength between about 390 nm and about 490 nm;
 illuminating the at least one nanoparticle with a second monochromatic beam having a second center wavelength between about 490 nm and about 580 nm; and
 illuminating the at least one nanoparticle with a third monochromatic beam having a third center wavelength between about 580 nm and about 760 nm.

15. A method of making a transparent display, the method comprising:
 (A) providing at least one nanoparticle having a scattering cross section with a full-width half maximum of about 1 nm to about 70 nm and a center wavelength from about 390 nm to about 760 nm, wherein the at least one nanoparticle is configured to scatter a monochromatic beam at a first wavelength in visible spectrum and to transmit ambient light at other wavelengths in the visible spectrum;
 (B) providing a substrate having a transmittance of about 90% to about 100% from about 390 nm to about 760 nm; and
 (C) depositing the at least one nanoparticle on the substrate.

16. The method of claim 15, wherein (A) comprises selecting at least one of:
 at least one first nanoparticle having a first scattering cross section with a first peak characterized by a first center wavelength of from about 390 nm to about 490 nm and a first full-width half-maximum (FWHM) of about 1 nm to about 70 nm;
 at least one second nanoparticle having a second scattering cross section with a second peak characterized by a second center wavelength of from about 490 nm to about 580 nm and a second FWHM of about 1 nm to about 70 nm; and
 at least one third nanoparticle having a third scattering cross section with a third peak characterized by a third center wavelength of from about 580 nm to about 760 nm and a third FWHM of about 1 nm to about 70 nm.

17. The method of claim 15, wherein the scattering cross section comprises:
 a first peak characterized by a first center wavelength of from about 390 nm to about 490 nm and a first full-width half-maximum of about 1 nm to about 70 nm;
 a second peak characterized by a second center wavelength of from about 490 nm to about 580 nm and a second full-width half-maximum of about 1 nm to about 70 nm; and
 a third peak characterized by a third center wavelength of from about 580 nm to about 760 nm and a third full-width half-maximum of about 1 nm to about 70 nm.

18. The method of claim 15, wherein (C) comprises:
 (i) dissolving the at least one nanoparticle in a liquid to form a nanoparticle solution;
 (ii) coating the nanoparticle solution on a surface of the substrate; and
 (iii) allowing the nanoparticle solution to dry on the surface of the substrate so as to fix the at least one nanoparticle to the substrate.

19. The method of claim 18, wherein (ii) comprises at least one of:
 spin-coating the nanoparticle solution onto the surface of the substrate;
 painting the nanoparticle solution onto the surface of the substrate;
 printing the nanoparticle solution onto the surface of the substrate; and
 spraying the nanoparticle solution onto the surface of the substrate.

20. The method of claim 15, wherein (C) comprises:
 (i) melting the substrate to form a liquid substrate;
 (ii) dissolving the at least one nanoparticle into the liquid substrate; and
 (iii) allowing the liquid substrate to harden so as to fix the at least one nanoparticle to or at least partially within the substrate.

21. The method of claim 15, wherein (C) comprises depositing plural nanoparticles on the substrate in a predetermined pattern.

\* \* \* \* \*